(12) United States Patent
Sato et al.

(10) Patent No.: US 7,349,006 B2
(45) Date of Patent: Mar. 25, 2008

(54) IMAGE PROCESSING APPARATUS AND METHOD, RECORDING MEDIUM, AND PROGRAM

(75) Inventors: Seiji Sato, Kanagawa (JP); Hidehiko Sekizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 778 days.

(21) Appl. No.: 10/656,828

(22) Filed: Sep. 5, 2003

(65) Prior Publication Data
US 2004/0125447 A1   Jul. 1, 2004

(30) Foreign Application Priority Data
Sep. 6, 2002   (JP)   ............... 2002-261540

(51) Int. Cl.
*H04N 13/04* (2006.01)
*G02B 27/22* (2006.01)

(52) U.S. Cl. ........................ 348/51; 359/466
(58) Field of Classification Search ................ 348/53, 348/42, 51, 52, 57; 345/419; 359/466
See application file for complete search history.

(56) References Cited

U.S. PATENT DOCUMENTS

| | | | | |
|---|---|---|---|---|
| 5,510,831 | A * | 4/1996 | Mayhew | 348/47 |
| 6,556,236 | B1 * | 4/2003 | Swift et al. | 348/56 |
| 6,657,655 | B1 * | 12/2003 | Iizuka et al. | 348/47 |
| 6,980,690 | B1 * | 12/2005 | Taylor et al. | 382/154 |
| 2004/0247174 | A1 * | 12/2004 | Lyons et al. | 382/154 |
| 2006/0098282 | A1 * | 5/2006 | McCart et al. | 359/472 |

FOREIGN PATENT DOCUMENTS

| | | |
|---|---|---|
| JP | 59-210436 | 11/1984 |
| JP | 63-81416 | 4/1988 |
| JP | 11-046373 | 2/1999 |
| JP | 11-355624 | 12/1999 |
| JP | 2001-012927 A | 1/2001 |
| JP | 2001-119620 A | 4/2001 |
| JP | 2001-333327 A | 11/2001 |
| JP | 2002-82307 A | 3/2002 |
| JP | 2002-159024 A | 5/2002 |
| JP | 2002-196281 A | 7/2002 |

* cited by examiner

*Primary Examiner*—Gims Philippe
(74) *Attorney, Agent, or Firm*—Wolf, Greenfield & Sacks, P.C.

(57) ABSTRACT

An image processing apparatus for generating image data for displaying a stereoscopic image on the basis of an image for a left eye and an image for a right eye, the image processing apparatus includes first detecting means for detecting image pairs each taken in a continuous shooting mode among a plurality of images, second detecting means for detecting image pairs each taken consecutively within a predetermined time among the plurality of images, presenting means for presenting the image pairs detected by the first detecting means or the second detecting means to a user, and generating means for setting one of two images comprising a the image pair selected by the user among the image pairs presented by the presenting means as the image for the left eye and the other as the image for the right eye, and generating the image data for displaying the stereoscopic image.

8 Claims, 21 Drawing Sheets

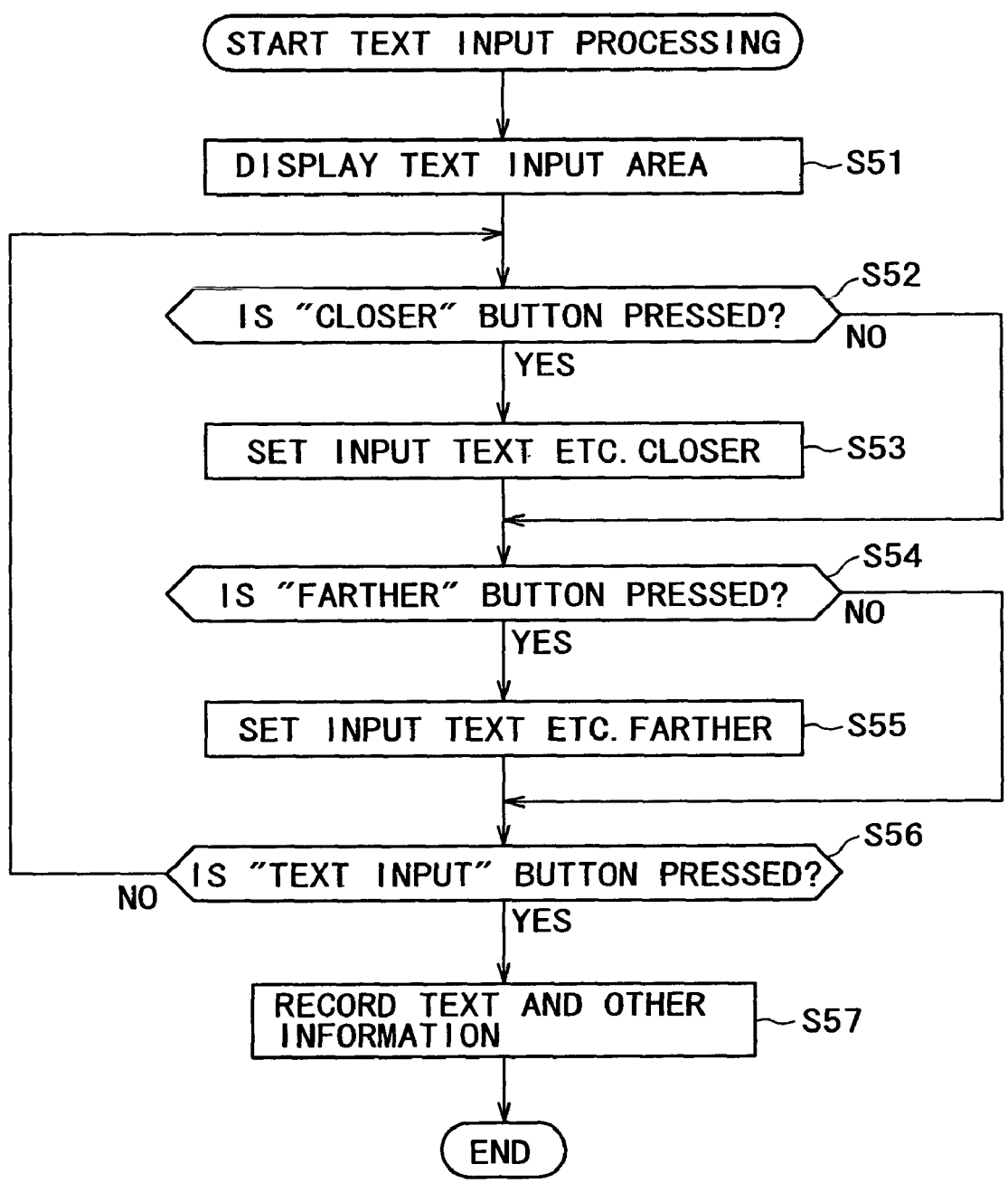

IMAGE PROCESSING APPARATUS AND METHOD, RECORDING MEDIUM, AND PROGRAM

BACKGROUND OF THE INVENTION

The present invention relates to an apparatus and a method for image processing, a recording medium, and a program, and particularly to an apparatus and a method for image processing, a recording medium, and a program suitable for use in generating a stereoscopic image on the basis of an image for the left eye and an image for the right eye, for example.

Many conventional methods are known which allow a two-dimensional image to be visually perceived three-dimensionally by using spatial difference (binocular parallax) between retina images obtained by the left and the right eye, respectively, of a human (the methods will hereinafter be described as stereoscopic methods).

The known stereoscopic methods include an anaglyph method, a color anaglyph method, a polarizing filter method, a time division stereoscopic television method and the like using special glasses, and a lenticular method and the like not using special glasses (for each method, see non-patent literature 1, for example).

In the anaglyph method, for example an image for the left eye (hereinafter described as an L image) is converted into a red monotone image and an image for the right eye (hereinafter described as an R image) is converted into a blue monotone image, and the red monotone image and the blue monotone image are superimposed on each other. Then the image is viewed with glasses having a red filter disposed on a left side thereof and a blue filter disposed on a right side thereof (hereinafter described as red and blue glasses). Although the anaglyph method can be carried out relatively easily and inexpensively, the entire image becomes a monotone image.

The color anaglyph method compensates the disadvantage of the anaglyph method. For a portion of an L image and an R image where corresponding positions in the images are displaced from each other when the L image and the R image are superimposed on each other (that is, a portion with a great parallax), as in the anaglyph method, for example the L image is converted into a red monotone image and the R image is converted into a blue monotone image, and the red monotone image and the blue monotone image are superimposed on each other. For a portion of the images where corresponding positions are not displaced from each other (that is, a portion with a small parallax), the images are superimposed on each other in original states of color. Then the image is viewed with red and blue glasses.

The color anaglyph method makes it possible to reproduce original color in the portion with a small parallax in the entire image. Incidentally, the color anaglyph method has a plurality of variations in terms of difference in color used for the portion with a small parallax. A method using original color in the portion with a small parallax will hereinafter be described as a first color anaglyph method. A method not using original color in the portion with a small parallax will hereinafter be described as a second color anaglyph method.

In the polarizing filter method, for example an L image projected by light linearly polarized in a vertical direction and an R image projected by light linearly polarized in a horizontal direction are superimposed on each other. Then the image is viewed with polarizing filter glasses having a vertical linear polarizing filter disposed on a left side thereof and a horizontal linear polarizing filter disposed on a right side thereof. The polarizing filter method has advantages of good color reproducibility and high resolution, but has a disadvantage of darkening the image by using the polarizing filters.

In the time division stereoscopic television method, an L image and an R image are displayed in each field cycle alternately on a television receiver, and the images are viewed with liquid crystal shutter glasses that have a left eye side and a right eye side opened and closed alternately in synchronism with field cycles of the television receiver. It is important in the time division stereoscopic television method to control the opening and closing operation of the liquid crystal shutter glasses with high accuracy.

In the lenticular method, a screen is divided into regions in a form of vertical stripes, and an L image and an R image are displayed alternately in a region on each stripe. The images are covered with a lens referred to as a lenticular screen.

In order to realize the various stereoscopic methods described above, an L image and an R image need to be obtained. The easiest method for obtaining an L image and an R image is that of moving the camera by an interval between both eyes of a human and shooting the same object twice.

In order to realize this easily, there is a camera having a stereoscopic photography mode that enables two images usable for stereoscopy to be taken continuously (see patent literature 1, for example).

Also, a method of attaching an optical adapter 11 including mirrors and the like to the outside of a picture taking lens 3 of a camera 1 as shown in FIG. 1, for example, is known as a method for obtaining an L image and an R image in one shot (see patent literature 2, for example).

FIG. 2 schematically shows a structure of the optical adapter 11. An optical image for the right eye which image is incident from a single light intake window is reflected by a mirror 21 toward a mirror 22, reflected by the mirror 22 toward the picture taking lens 3, and then condensed by the picture taking lens 3. An optical image for the left eye which image is incident from the single light intake window is condensed by the picture taking lens 3 without being reflected by the mirrors 21 and 22.

The optical images incident via the optical adapter 11 are taken as an image including a region for the left eye and a region for the right eye (the image will hereinafter be described as a parallax image) as shown in FIG. 3. The region for the left eye is used as an L image and the region for the right eye is used as an R image.

[Non-patent Literature 1]
"Fundamentals of Three-Dimensional Images" edited by NHK Science & Technical Research Laboratories under the supervision of Takehiro Izumi, Ohmsha, Ltd., published on Jun. 5, 1995

[Patent Literature 1]
Japanese Patent Laid-Open No. 2001-333327

[Patent Literature 2]
Japanese Patent Laid-Open No. Hei 11-46373

It is convenient if an image pair usable as an L image and an R image for stereoscopy can be detected from among a plurality of images taken in an ordinary method rather than using a parallax image taken by the camera mounted with the optical adapter 11 or an image pair for stereoscopy taken by the camera having the stereoscopic photography mode as described above as an L image and an R image. Conventionally, however, such method has not been established.

SUMMARY OF THE INVENTION

It is accordingly an object of the present invention to enable an image pair usable as an L image and an R image for stereoscopy to be detected from among a plurality of images.

According to the present invention, there is provided an image processing apparatus including: first detecting means for detecting image pairs each taken in a continuous shooting mode among a plurality of images; second detecting means for detecting image pairs each taken consecutively within a predetermined time among the plurality of images; presenting means for presenting the image pairs detected by the first detecting means or the second detecting means to a user; and generating means for setting one of two images including an image pair selected by the user among the image pairs presented by the presenting means as an image for the left eye and the other as an image for the right eye, and generating image data for displaying a stereoscopic image.

The image processing apparatus according to the present invention can further include calculating means for calculating a degree of similarity between two images including an image pair detected by the first detecting means or the second detecting means.

The presenting means can present image pairs having a degree of similarity equal to or more than a threshold value to the user.

The image processing apparatus according to the present invention can further include receiving means for receiving a user operation for selecting two images to be set as an image pair from among the plurality of images.

The image processing apparatus according to the present invention can further include recording means for recording image data of the two images including the image pair in association with the image data for displaying the stereoscopic image.

According to the present invention, there is provided an image processing method including: a first detecting step for detecting image pairs each taken in a continuous shooting mode among a plurality of images; a second detecting step for detecting image pairs each taken consecutively within a predetermined time among the plurality of images; a presenting step for presenting the image pairs detected by processing of the first detecting step or the second detecting step to a user; and a generating step for setting one of two images including an image pair selected by the user among the image pairs presented by processing of the presenting step as an image for the left eye and the other as an image for the right eye, and generating image data for displaying a stereoscopic image.

According to the present invention, there is provided a program on a recording medium, the program including: a first detecting step for detecting image pairs each taken in a continuous shooting mode among a plurality of images; a second detecting step for detecting image pairs each taken consecutively within a predetermined time among the plurality of images; a presenting step for presenting the image pairs detected by processing of the first detecting step or the second detecting step to a user; and a generating step for setting one of two images including an image pair selected by the user among the image pairs presented by processing of the presenting step as an image for the left eye and the other as an image for the right eye, and generating image data for displaying a stereoscopic image.

According to the present invention, there is provided a program for making a computer perform processing, the processing including: a first detecting step for detecting image pairs each taken in a continuous shooting mode among a plurality of images; a second detecting step for detecting image pairs each taken consecutively within a predetermined time among the plurality of images; a presenting step for presenting the image pairs detected by processing of the first detecting step or the second detecting step to a user; and a generating step for setting one of two images including an image pair selected by the user among the image pairs presented by processing of the presenting step as an image for the left eye and the other as an image for the right eye, and generating image data for displaying a stereoscopic image.

The image processing apparatus and method, and the program according to the present invention set one of two images including an image pair selected by a user among image pairs each taken in a continuous shooting mode or image pairs each taken consecutively within a predetermined time as an image for the left eye and the other as an image for the right eye, and generate image data for displaying a stereoscopic image.

BRIEF DESCRIPTION OF THE DRAWINGS

FIG. 21 is a flowchart of assistance in explaining text input processing.

DETAILED DESCRIPTION OF PREFERRED EMBODIMENTS

Figure 4:
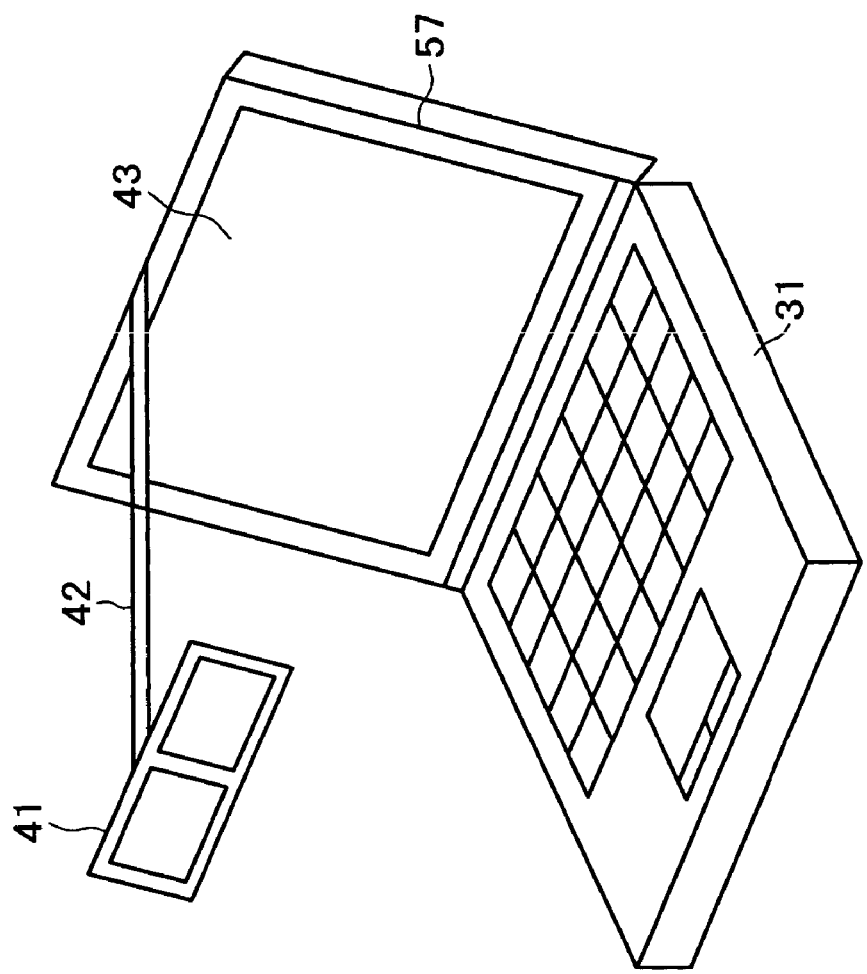
FIG. 4 is a diagram showing an example of composition of a stereoscopic system to which the present invention is applied.

FIG. 4 shows an example of composition of a stereoscopic system to which the present invention is applied. The stereoscopic system mainly includes a personal computer (PC) 31 for generating a stereoscopic image, filter glasses 41 used by a user when viewing a displayed stereoscopic image, and a line polarizing plate 43 disposed on the outside of a display surface of a display unit 57 of the personal computer 31.

Figure 1:
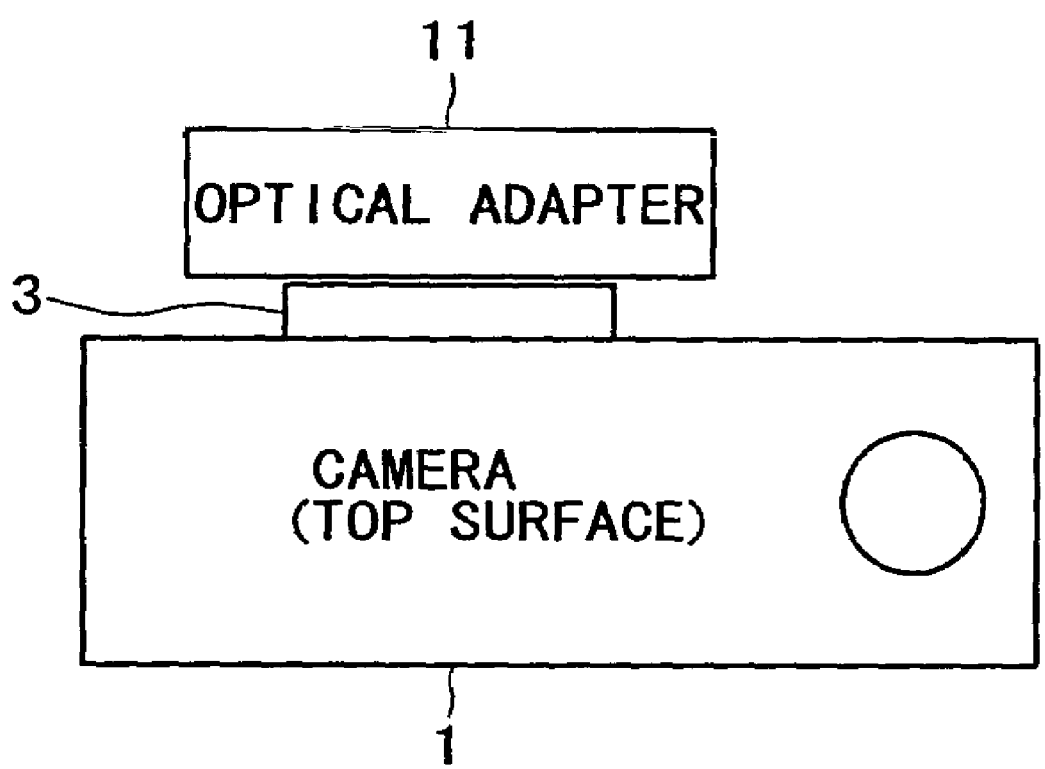
FIG. 1 is a diagram showing a state in which an optical adapter is attached to a camera.
Figure 2:
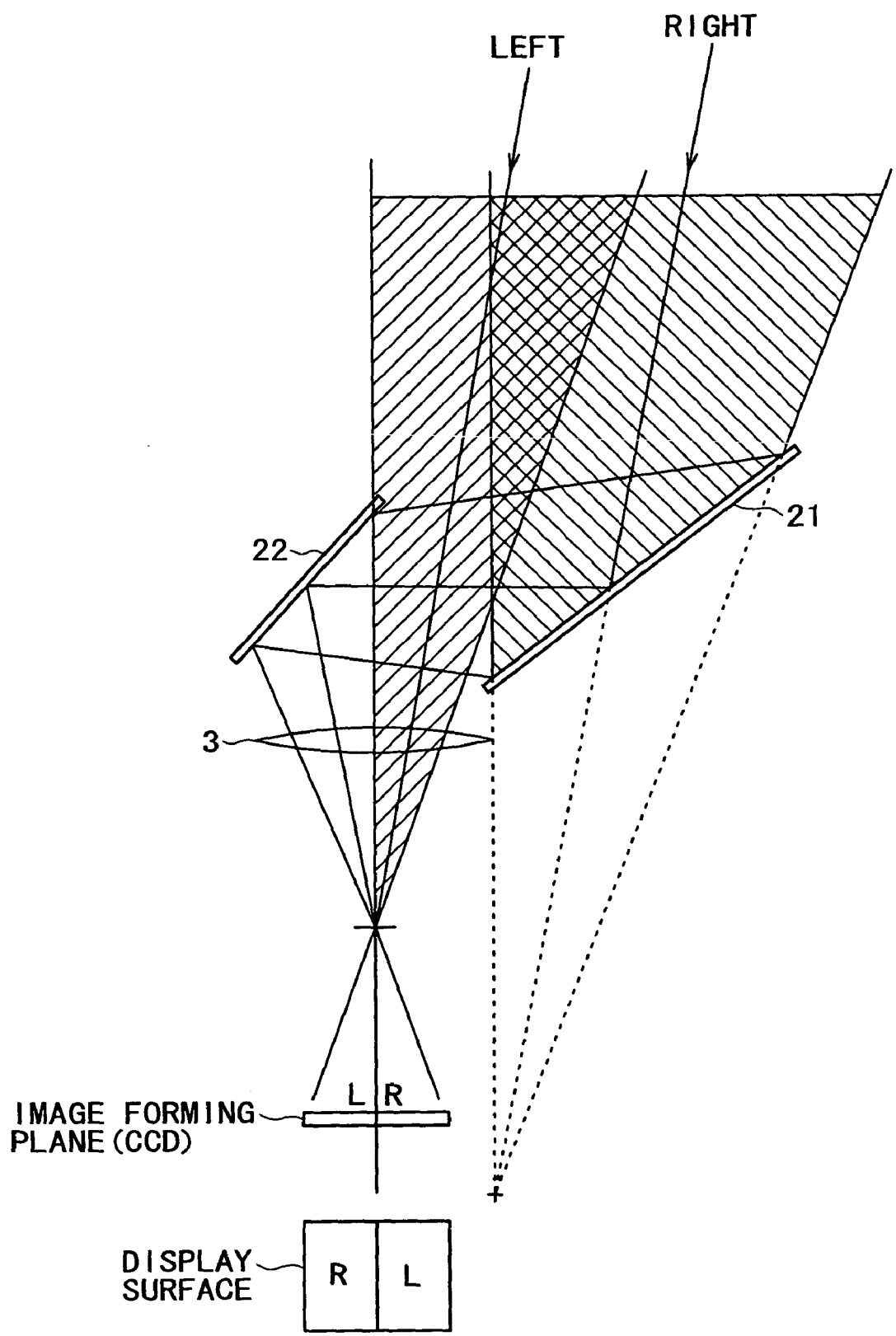
FIG. 2 is a diagram showing an example of composition of the optical adapter in FIG. 1.
Figure 3:
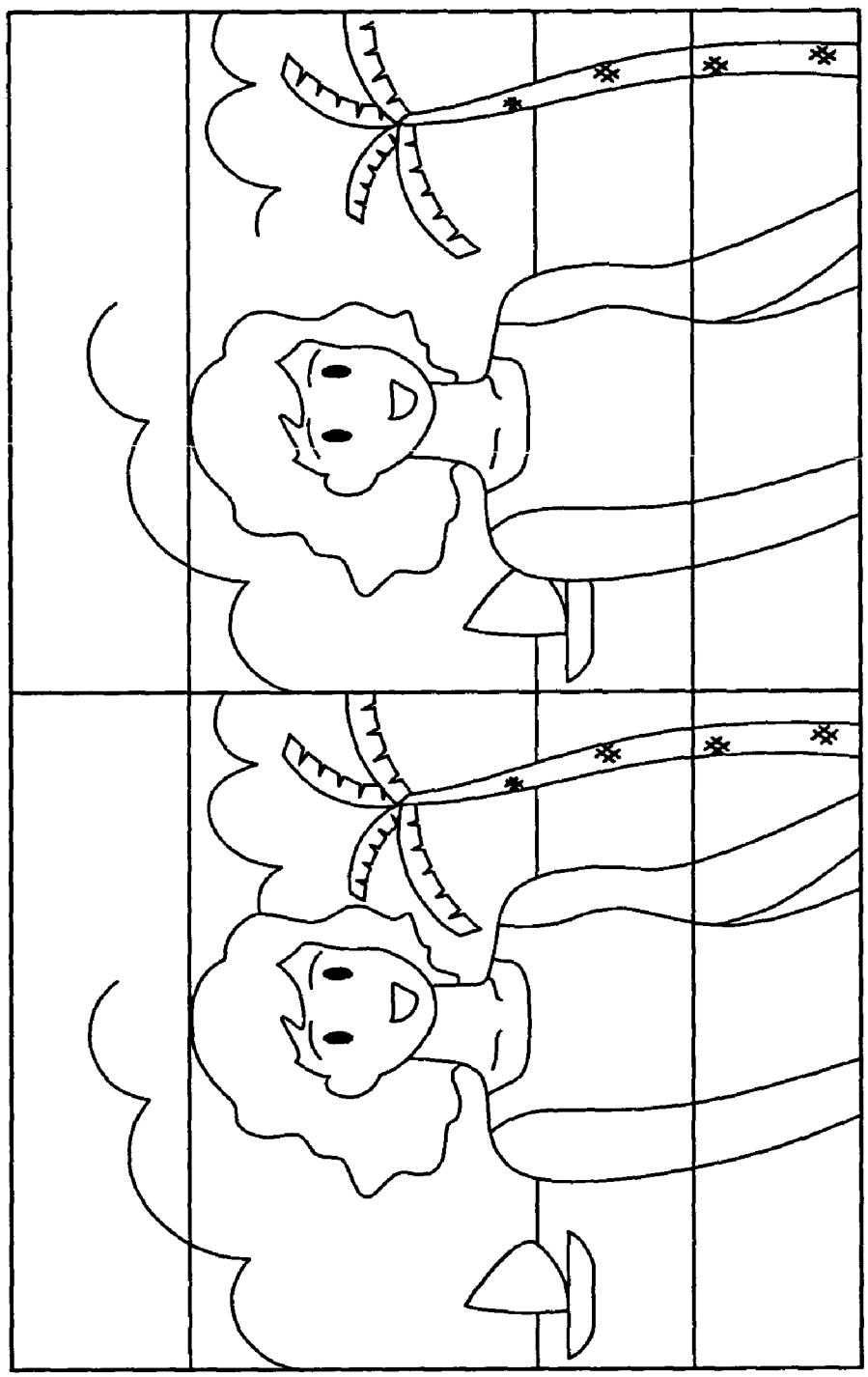
FIG. 3 is a diagram showing a parallax image taken by a camera mounted with an optical adapter.

The personal computer 31 captures a parallax image taken by a camera (digital still camera) 1 mounted with an optical adapter 11 as shown in FIG. 1, images taken without the optical adapter 11, and the like, and generates and displays a stereoscopic image on the basis of a parallax image or an image pair including two images taken continuously. Image data of a parallax image or the like captured into the personal computer 31 from the digital still camera 1 is provided with attribute information such as a date and time of shooting, a serial file number indicating an order of shooting, a continuous shooting mode flag indicating whether or not the image is taken in a continuous shooting mode, and the like.

The filter glasses 41 are supported by a supporting rod 42 connected to the personal computer 31 so as to be situated in a space above and near a keyboard of the personal computer 31. A linear polarizing filter in a vertical direction is disposed in a left frame of the filter glasses 41. A linear polarizing filter in a horizontal direction is disposed in a right frame of the filter glasses 41.

The line polarizing plate 43 disposed on the outside of the display surface of the display unit 57 of the personal computer 31 has a linear polarizing filter in a vertical direction disposed in an even-numbered line in a horizontal direction and a linear polarizing filter in the horizontal direction disposed in an odd-numbered line in the horizontal direction.

The filter glasses 41, the supporting rod 42, and the line polarizing plate 43 are sold in a set together with the optical adapter 11 in FIG. 1, an image processing program 65 (to be described later with reference to FIG. 10) and the like, for example.

An outline of a process of generating a stereoscopic image by the personal computer 31 will next be described with reference to FIGS. 5 to 8.

Figure 5:
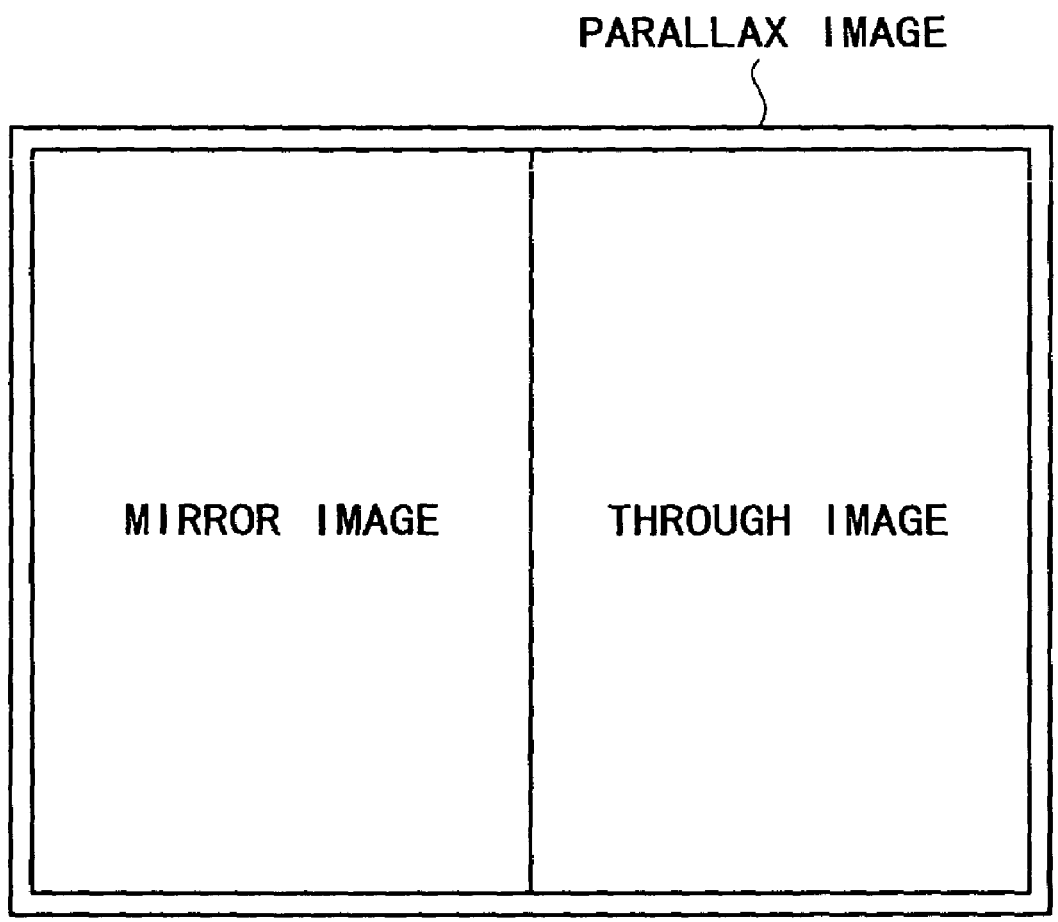
FIG. 5 is a diagram showing a parallax image including a mirror image and a through image.

FIG. 5 shows a parallax image taken by the digital still camera 1 mounted with the optical adapter 11. In FIG. 5, a region for the right eye of the parallax image is formed through reflection by mirrors, and a region for the left eye of the parallax image is formed without reflection by mirrors. Accordingly, the region for the right eye of the parallax image will hereinafter be described as a mirror image, and the region for the left eye of the parallax image will hereinafter be described as a through image.

Figure 6:
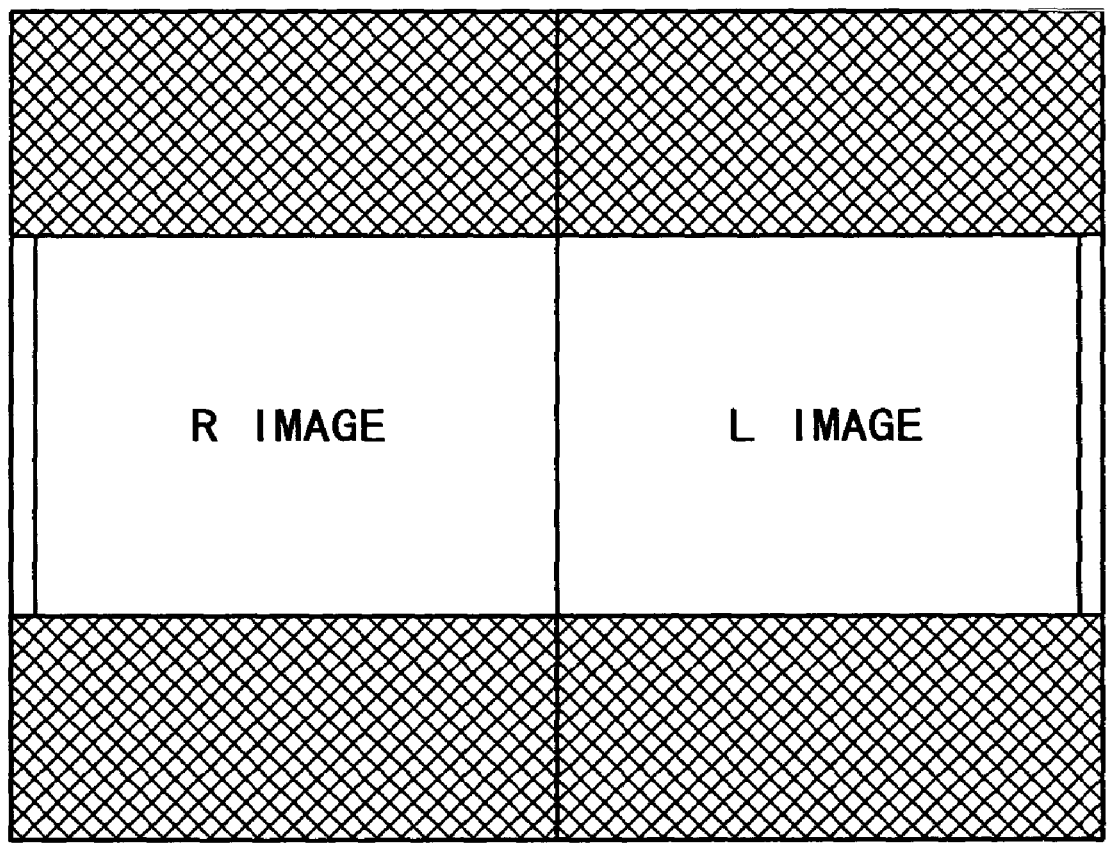
FIG. 6 is a diagram showing an L image and an R image obtained by cropping the mirror image and the through image.

As described above, the mirror image is degraded in image quality (brightness, chroma, resolution and the like) as compared with the through image. A peripheral portion (an upper side portion, a lower side portion, and a left side portion) of the mirror image, in particular, is degraded in brightness as compared with a central portion. Also, in the mirror image, an originally rectangular image is distorted into a trapezoidal shape. Accordingly, first the image quality of the mirror image is corrected (details will be described later with reference to FIG. 14) and the distorted shape of the image is corrected. Then the mirror image and the through image are each cropped as shown in FIG. 6 to generate an R image and an L image.

Figure 7:
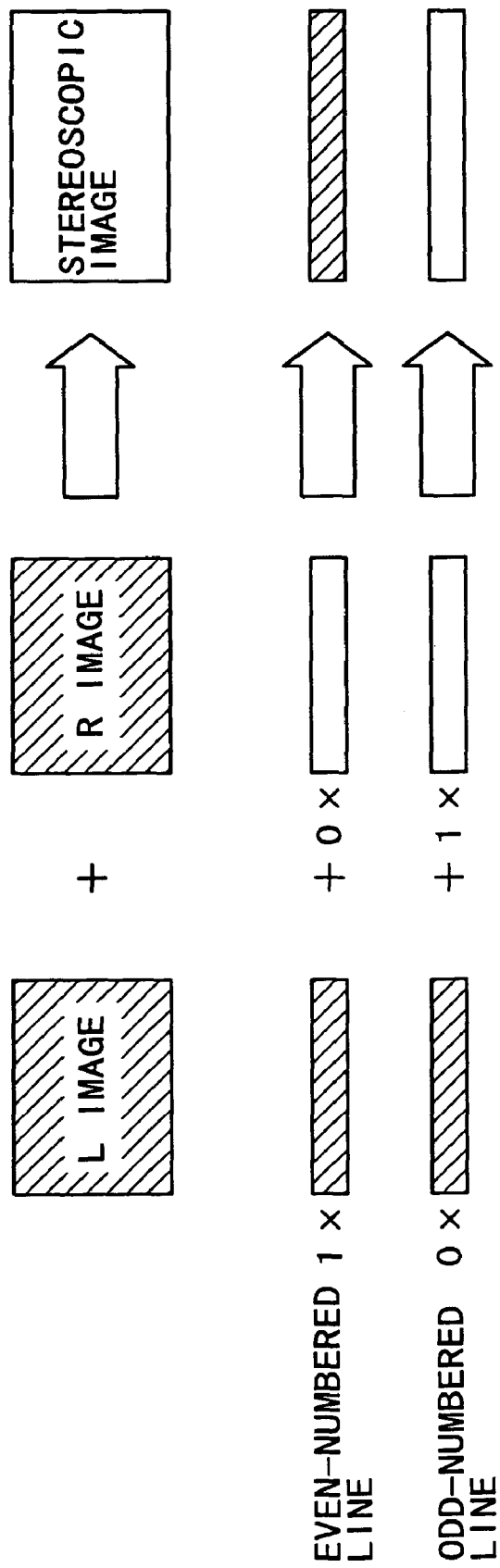
FIG. 7 is a diagram of assistance in explaining processing for generating a stereoscopic image by combining the L image and the R image with each other.
Figure 8:
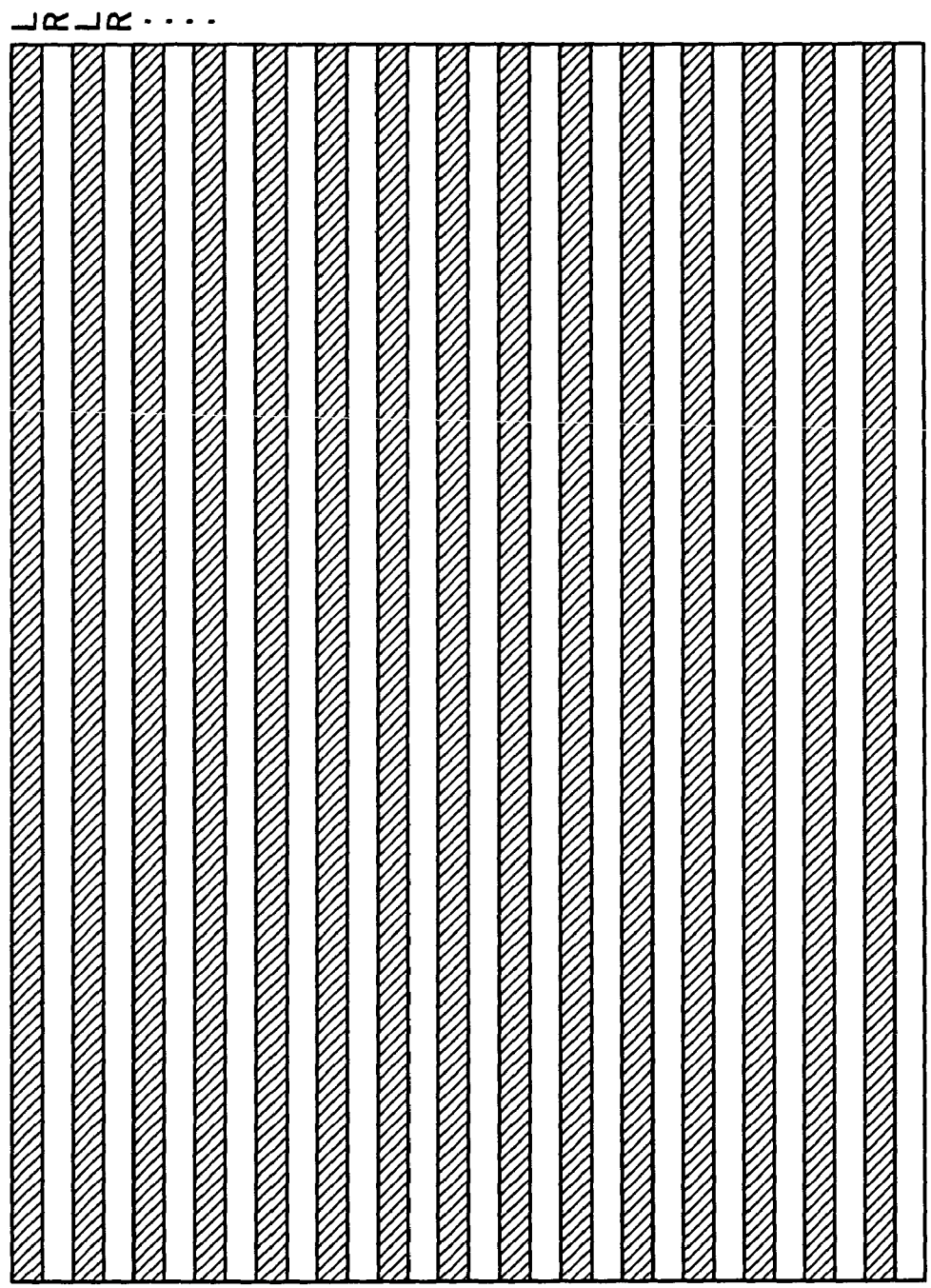
FIG. 8 is a diagram showing the stereoscopic image.

Then, the L image and the R image are combined with each other according to the next equation (1) as shown in FIG. 7 to generate a stereoscopic image as shown in FIG. 8.

Even-numbered Line $$1\times(\text{pixels of the } L \text{ image})+0\times(\text{pixels of the } R \text{ image})$$
$$=(\text{pixels of the stereoscopic image})$$

Odd-numbered Line $$0\times(\text{pixels of the } L \text{ image})+1\times(\text{pixels of the } R \text{ image})$$
$$=(\text{pixels of the stereoscopic image}) \quad (1)$$

Figure 9:
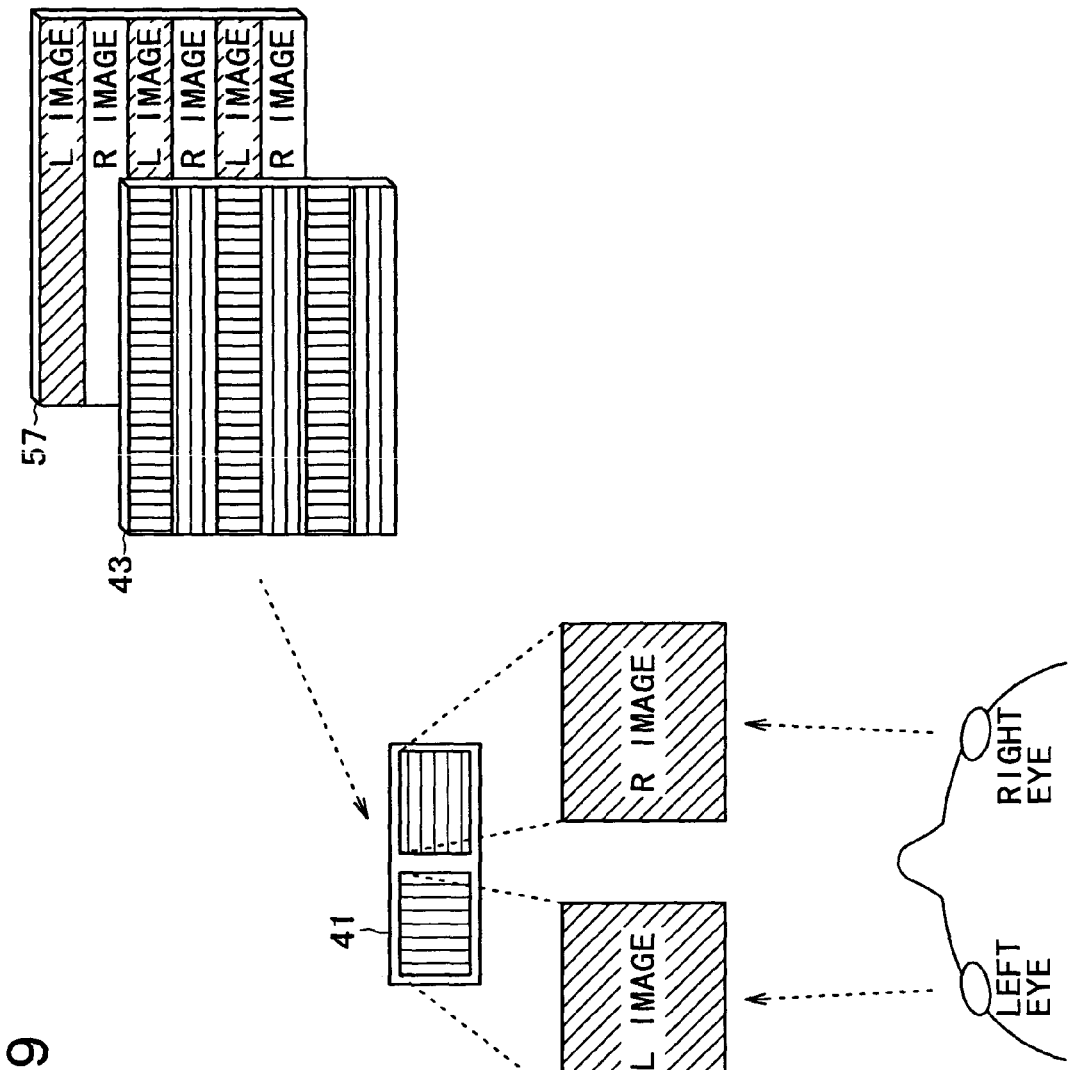
FIG. 9 is a diagram of assistance in explaining an outline of three-dimensional visual perception of the stereoscopic image.

The outline of the process of generating a stereoscopic image has been described above. The generated stereoscopic image is displayed on the display unit 57. As shown in FIG. 9, a user views the stereoscopic image displayed on the display unit 57 through the filter glasses 41 and the line polarizing plate 43. Thus, the left eye of the user views the L image in the even-numbered lines, that is, alternate lines of the stereoscopic image, and the right eye of the user views the R image in the odd-numbered lines, that is, alternate lines of the stereoscopic image. Therefore the user can visually perceive the stereoscopic image three-dimensionally.

Figure 10:
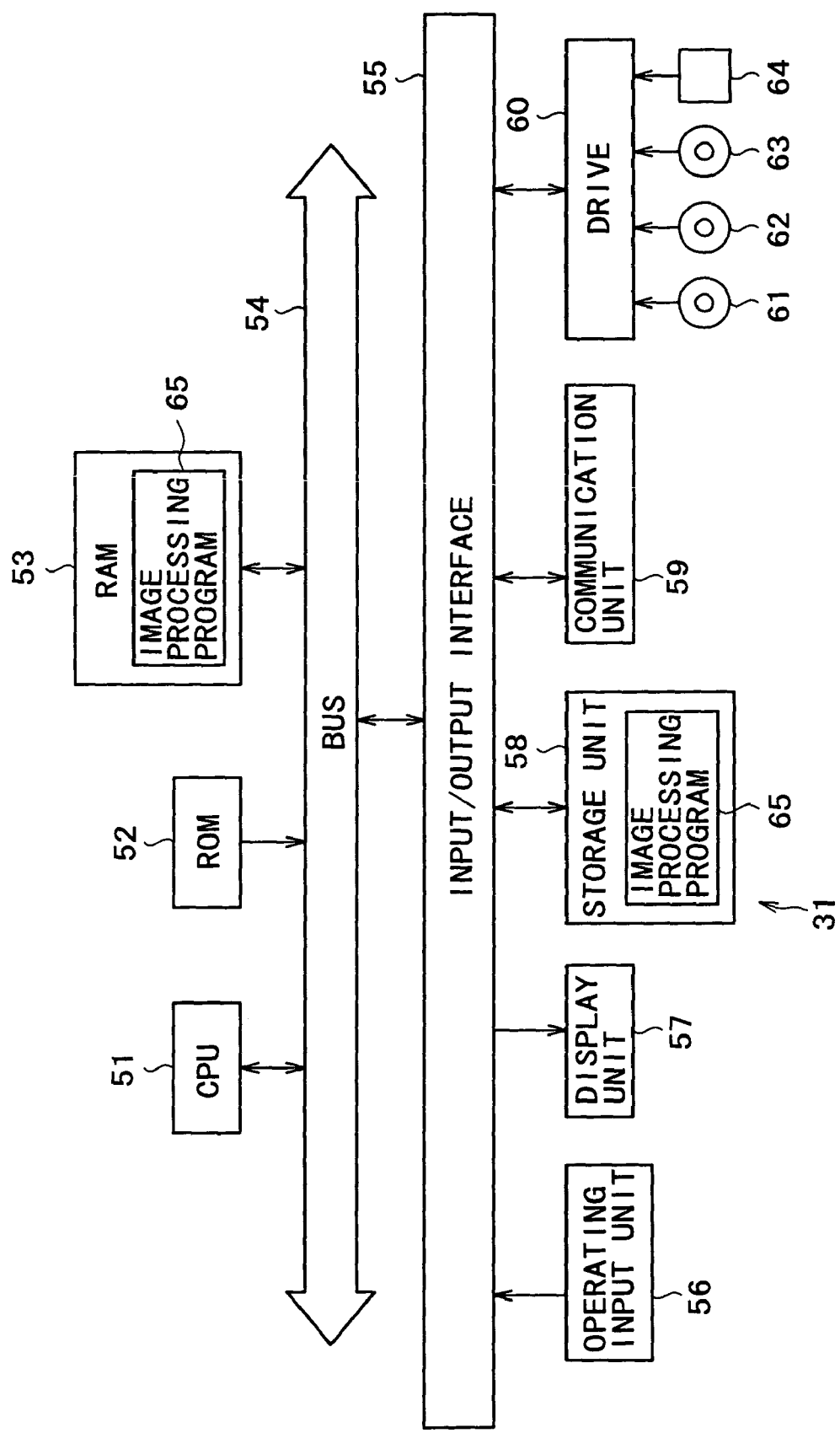
FIG. 10 is a block diagram showing an example of configuration of the personal computer in FIG. 4.

Next, FIG. 10 shows an example of configuration of the personal computer 31 for generating a stereoscopic image by executing an image processing program 65 and the like.

The personal computer 31 includes a CPU (Central Processing Unit) 51. The CPU 51 is connected with an input/output interface 55 via a bus 54. The bus 54 is connected with a ROM (Read Only Memory) 52 and a RAM (Random Access Memory) 53.

The input/output interface 55 is connected with: an operating input unit 56 including input devices such as a keyboard and a mouse for the user to input an operating command; a display unit 57 formed by an LCD (Liquid Crystal Display) or the like for displaying a GUI (Graphical User Interface), a generated stereoscopic image and the like; a storage unit 58 formed by a hard disk drive or the like for storing various programs and data; and a communication unit 59 for communicating data via a network such as the Internet or the like. The input/output interface 55 is also connected with a drive 60 for reading and writing data from and to recording media such as a magnetic disk 61, an optical disk 62, a magneto-optical disk 63, and a semiconductor memory 64.

The CPU 51 performs various processing according to a program stored in the ROM 52 or a program read from the magnetic disk 61 to the semiconductor memory 64, stored in the storage unit 58, and then loaded from the storage unit 58 into the RAM 53. The RAM 53 also stores data necessary for the CPU 51 to perform various processing and the like as required.

The image processing program 65 for allowing the personal computer 31 to perform processing for generating a stereoscopic image and the like is supplied to the personal computer 31 in a state of being stored on the magnetic disk 61 (including flexible disks), the optical disk 62 (including CD-ROM (Compact Disc-Read Only Memory) and DVD (Digital Versatile Disc)), the magneto-optical disk 63 (including MD (Mini Disc)), or the semiconductor memory 64. The image processing program 65 is then read by the drive 60 and installed in the hard disk drive included in the storage unit 58. At a command of the CPU 51 corresponding to a command inputted from the user to the operating input unit 56, the image processing program 65 installed in the storage unit 58 is loaded from the storage unit 58 into the RAM 53 to be executed.

Figure 11:
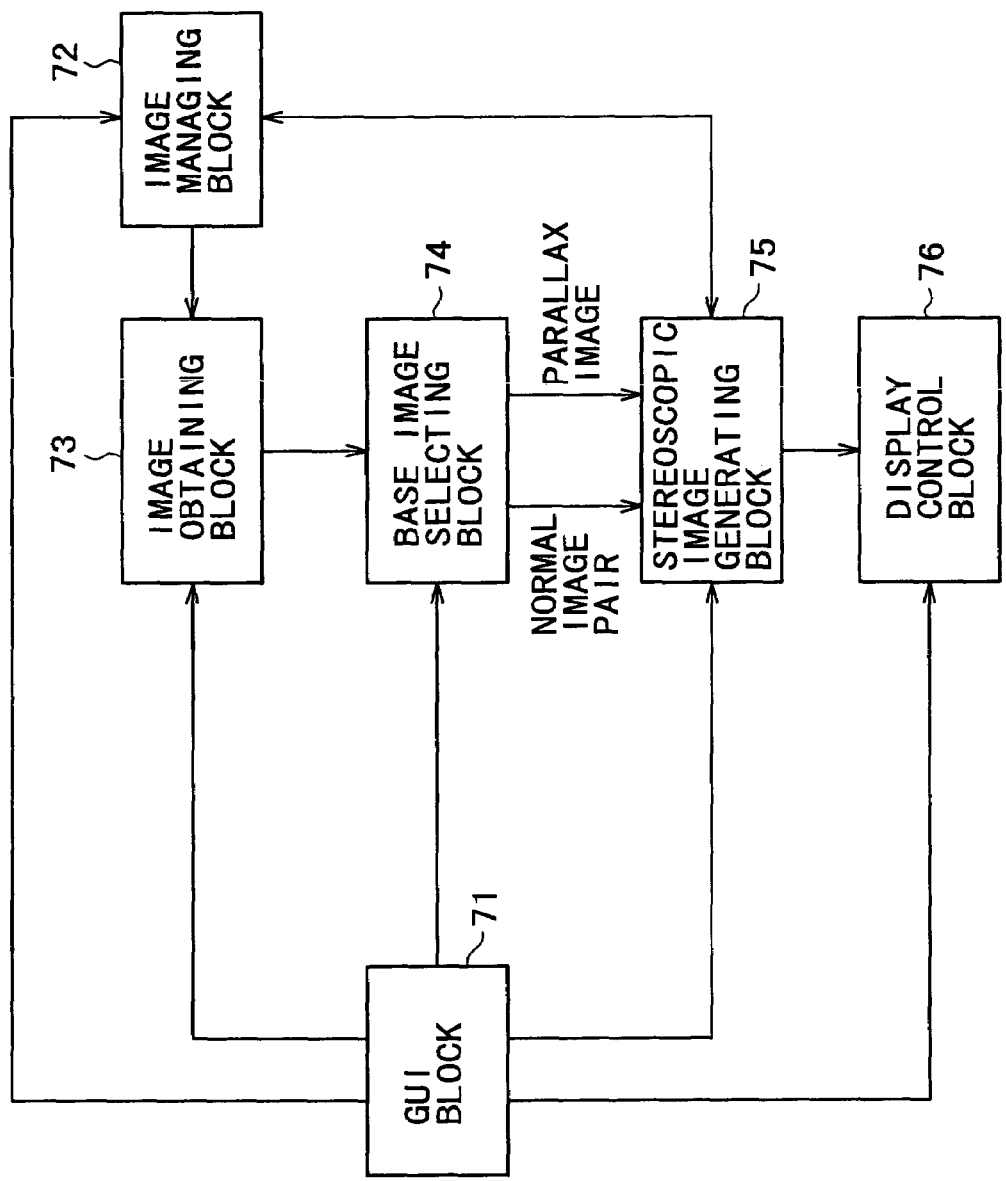
FIG. 11 is a diagram showing an example of configuration of functional blocks realized by the execution of an image processing program by a CPU in FIG. 10.

FIG. 11 shows an example of configuration of functional blocks realized by the execution of the image processing program by the CPU 51.

A GUI block 71 controls an image managing unit 72 to a display control unit 76 in such a manner as to correspond to operation of a GUI by the user. The image managing block 72 under control of the GUI block 71 manages image data such as parallax images captured from the digital camera 1 and stored in the storage unit 58 or the like as data to be handled by the image processing program 65. The image managing block 72 also adds image data of thumbnail images (reduced images), information indicating positions of cropped areas, information indicating setting values when picture quality is corrected, information indicating adjustment values when vertical positions are adjusted, and the like to attribute information added to the parallax images.

Under control from the GUI block 71, an image obtaining block 73 obtains image data such as parallax images and the like managed by the image managing block 72, and then outputs the image data to a base image selecting block 74. The base image selecting block 74 outputs to a stereoscopic image generating block 75 a parallax image or an image pair selected by the user among the images inputted from the image obtaining block 73 under control from the GUI block 71 corresponding to a user operation. Also, under control from the GUI block 71 corresponding to a user operation, the base image selecting block 74 selects an image pair that can serve as a basis for a stereoscopic image among the images inputted from the image obtaining block 73, and outputs the image pair to the stereoscopic image generating block 75.

Under control from the GUI block 71, the stereoscopic image generating block 75 generates a stereoscopic image on the basis of the parallax image or the image pair inputted from the base image selecting block 74, and then outputs the stereoscopic image to the display control block 76. The display control block 76 controls display of a GUI and the generated stereoscopic image under control from the GUI block 71.

Stereoscopic image generation processing for generating a stereoscopic image on the basis of a parallax image will next be described. Prior to the description, a window corresponding to the image processing program 65 and a GUI on the window will be described with reference to FIG. 12 and FIG. 13.

Figure 12:
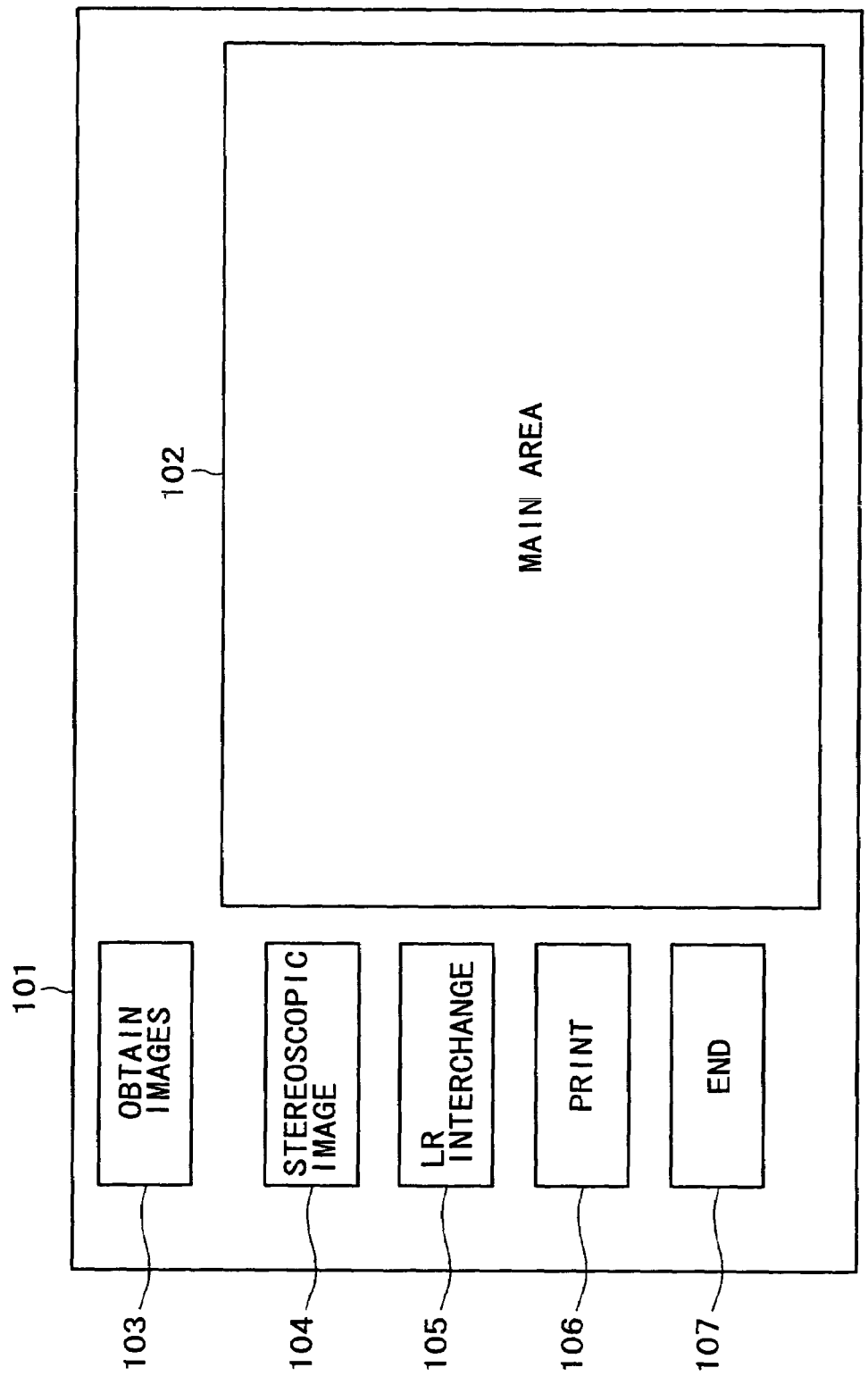
FIG. 12 is a diagram showing an example of display of a window corresponding to the image processing program.

FIG. 12 shows an example of display of a window 101 displayed when the image processing program 65 is started. The window 101 has a main area 102 in which thumbnails of images to be processed and the like are displayed, and a "stereoscopic image" button 104 to an "end" button 107.

An "obtain images" button 103 is pressed to display thumbnails for selecting a parallax image and an image pair serving as a basis for a stereoscopic image in the main area 102. A "stereoscopic image" button 104 is pressed to start generation of a stereoscopic image on the basis of a selected parallax image (or image pair). An "LR interchange" button 105 is pressed to interchange an L image and an R image serving as a basis for a stereoscopic image. A "print" button 106 is pressed to print out a generated stereoscopic image and the like. An "end" button 107 is pressed to end the image processing program.

Figure 13:
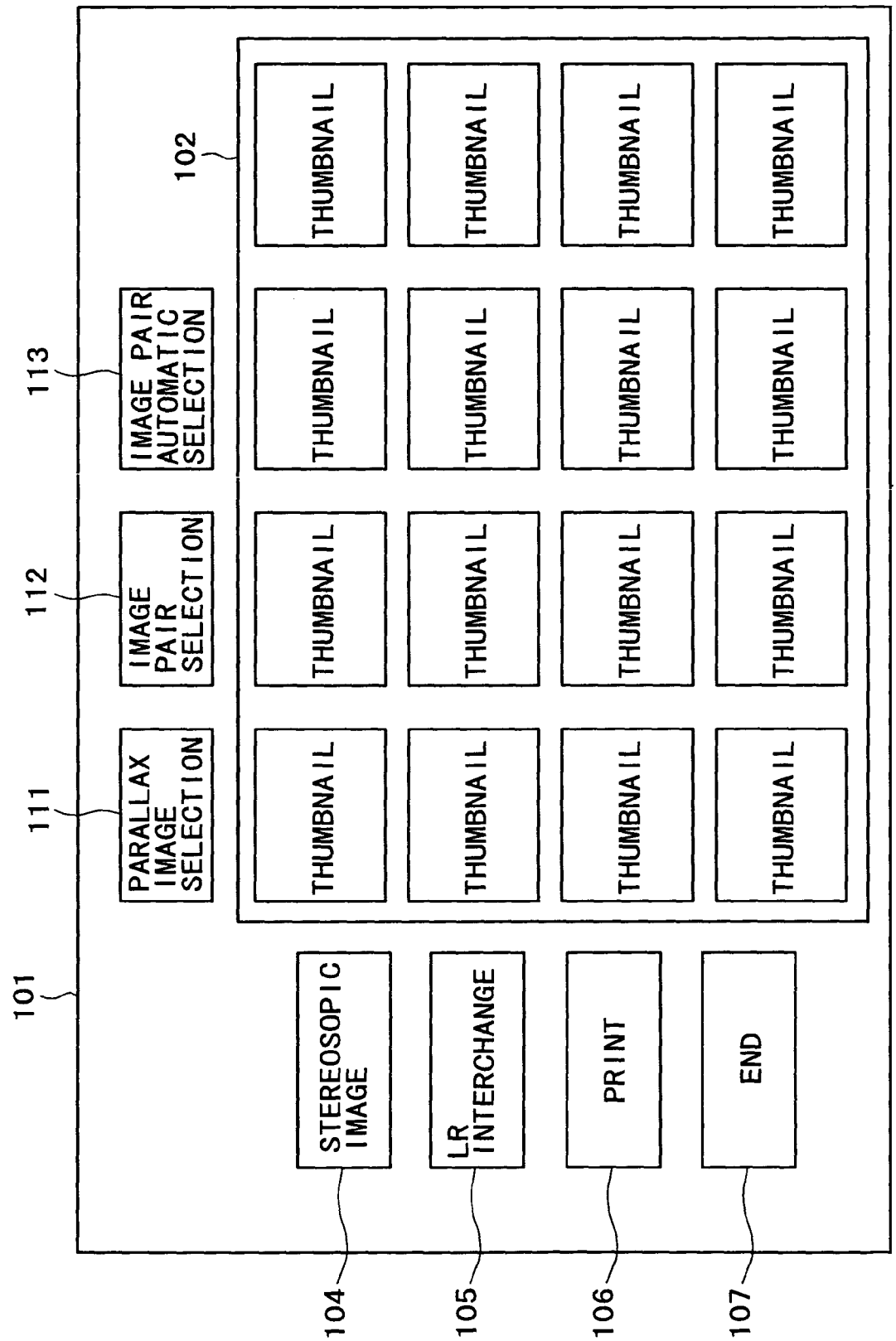
FIG. 13 is a diagram showing an example of display of the window when an "obtain images" button in FIG. 12 is pressed.

FIG. 13 shows an example of display of the window 101 when the "obtain images" button 103 is pressed. Thumbnail images of parallax images, normal images (including a pair of images taken continuously) and the like captured from the digital camera 1 are displayed in the main area 102. A "parallax image selection" button 111, an "image pair selection" button 112, and an "image pair automatic selection" button 113 are provided on an upper side of the main area 102.

The "parallax image selection" button 111 is pressed to select thumbnail images corresponding to parallax images among thumbnail images displayed in the main area 102. That is, the user can select only one thumbnail corresponding to a parallax image after pressing the "parallax image selection" button 111.

The "image pair selection" button 112 is pressed to select thumbnail images corresponding to image pairs serving as a basis for stereoscopic images among thumbnail images displayed in the main area 102. That is, the user can select two thumbnails corresponding to a image pair after pressing the "image pair selection" button 112.

The "image pair automatic selection" button 113 is pressed to allow an image pair serving as a basis for a stereoscopic image to be selected automatically among thumbnail images displayed in the main area 102.

Figure 14:
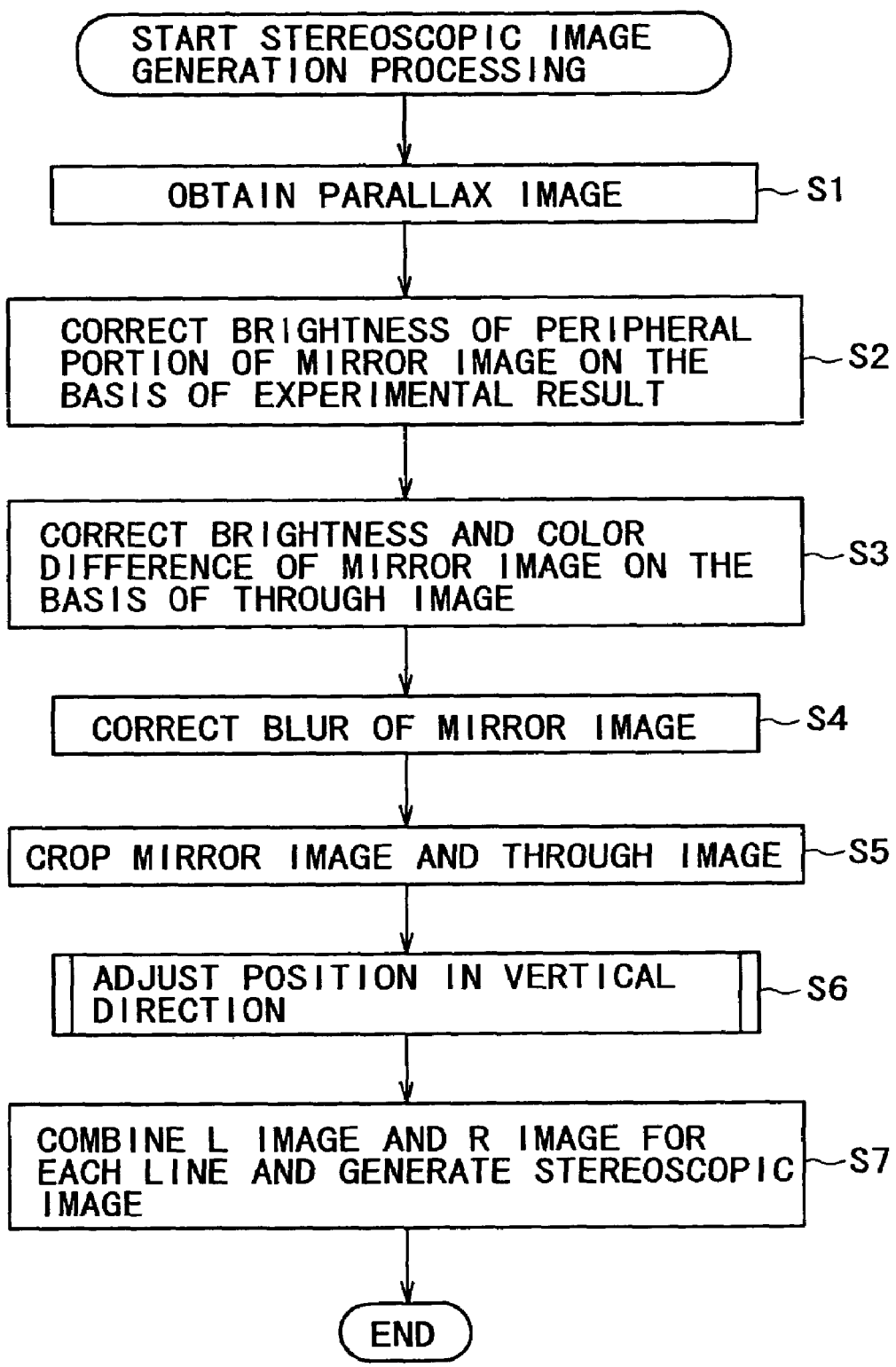
FIG. 14 is a flowchart of assistance in explaining stereoscopic image generation processing.

The stereoscopic image generation processing for generating a stereoscopic image on the basis of a parallax image will next be described with reference to a flowchart of FIG. 14. This stereoscopic image generation processing is started when the user presses the "stereoscopic image" button 104 after selecting a thumbnail corresponding to a parallax image among the thumbnails in the main area 102 shown in FIG. 13.

At a step S1, the base image selecting block 74 outputs image data of the parallax image selected by the user among image data inputted from the image obtaining block 73 to the stereoscopic image generating block 75 under control from the GUI block 71.

At a step S2, the stereoscopic image generating block 75 corrects brightness of a peripheral portion of a mirror image using a look-up table (or a function) based on an experimental result. Information on the correction is outputted to the image managing block 72, and then the image managing block 72 adds the information to attribute information of the parallax image.

The experiment is conducted by the developer side of the image processing program 65. Specifically, a white wall or the like occupying the whole of an angle of view is shot by the digital camera 1 mounted with the optical adapter 11, and brightness of pixels of a central portion of a mirror image of a parallax image obtained is compared with brightness of pixels of a peripheral portion of the mirror image. Then, for example a look-up table (which may be a function) that has coordinates of the peripheral portion as input and outputs correction values for the coordinates is generated on the basis of a result of the comparison so that the brightness of the pixels of the peripheral portion coincides with the brightness of the pixels of the central portion. Alternatively, a look-up table that has the brightness of the peripheral portion as input and outputs correction values for the brightness is generated. Then it suffices to incorporate the generated look-up table in the image processing program 65. A plurality of look-up tables corresponding to models of digital cameras 1 may be incorporated in the image processing program 65.

Incidentally, brightness of a through image may be corrected at the step S2.

At the step S2, the stereoscopic image generating block 75 also corrects a distorted trapezoidal shape of the mirror image. The correction of the shape of a mirror image has already been proposed by the present applicant in Japanese Patent Laid-Open No. 2002-34054, and hence its description will be omitted.

At a step S3, the stereoscopic image generating block 75 compares overall brightness of the corrected mirror image with that of the through image, and then corrects the brightness of the mirror image on the basis of a result of the comparison. Specifically, the stereoscopic image generating block 75 adds brightness of a plurality of predetermined sampling points (four points, for example) together in each of the mirror image and the through image, compares a value of addition of the brightness in the mirror image with a value of addition of the brightness in the through image, and corrects the mirror image so as to eliminate a difference between the values. Information on the correction is also outputted to the image managing block 72, and then the image managing block 72 adds the information to the attribute information of the parallax image.

When a value of addition of the brightness of four sampling points in the mirror image is 350 and a value of addition of the brightness of four sampling points in the through image is 500, for example, a value obtained by dividing the difference of 150 by the number of sampling points (150/4) is added to the brightness of every pixel of the mirror image.

At the step S3, the stereoscopic image generating block 75 also corrects color difference of the mirror image so that overall chroma of the mirror image coincides with that of the through image. Information on the correction is also outputted to the image managing block 72, and then the image managing block 72 adds the information to the attribute information of the parallax image.

At a step S4, the stereoscopic image generating block 75 subjects the mirror image to predetermined edge enhancement processing to correct overall blur of the image. At a step S5, under control from the GUI block 71 corresponding to a user operation, the stereoscopic image generating block 75 crops the mirror image and the through image, and sets the mirror image and the through image as an L image and an R image. Information on the cropping positions is outputted to the image managing block 72, and then the image managing block 72 adds the information to the attribute information of the parallax image.

At a step S6, under control from the GUI block 71 corresponding to a user operation, the stereoscopic image generating block 75 adjusts the vertical position of the L image and the R image. Incidentally, information in a process of adjusting the vertical position of the L image and the R image is outputted to the display control block 76 to display a state of the adjustment in the main area 102 (details will be described later with reference to a flowchart of FIG. 16).

At a step S7, the stereoscopic image generating block 75 combines the L image and the R image adjusted in the vertical position by the processing of the step S6 according to the equation (1), and thereby generates a stereoscopic image. The generated stereoscopic image is displayed in the main area 102. Image data of the generated stereoscopic image is stored in association with the original parallax image by the image managing block 72.

Incidentally, the generated stereoscopic image can be displayed so as to occupy the whole of the display unit 57 by a predetermined operation from the user. This concludes the description of the stereoscopic image generation processing.

The image processing program 65 makes it possible to generate a stereoscopic image also on the basis of an image pair including two images. The image pair can be selected arbitrarily by the user by pressing the "image pair selection" button 112 shown in FIG. 13 and selecting two of the thumbnail images displayed in the main area 102.

When the "stereoscopic image" button 104 is pressed after the image pair is selected, one of the pair images is set as an L image and the other is set as an R image, and the above-described processing from the step S6 on down is started to generate a stereoscopic image. Image data of the generated stereoscopic image is stored in association with the original image pair by the image managing block 72.

Figure 15:
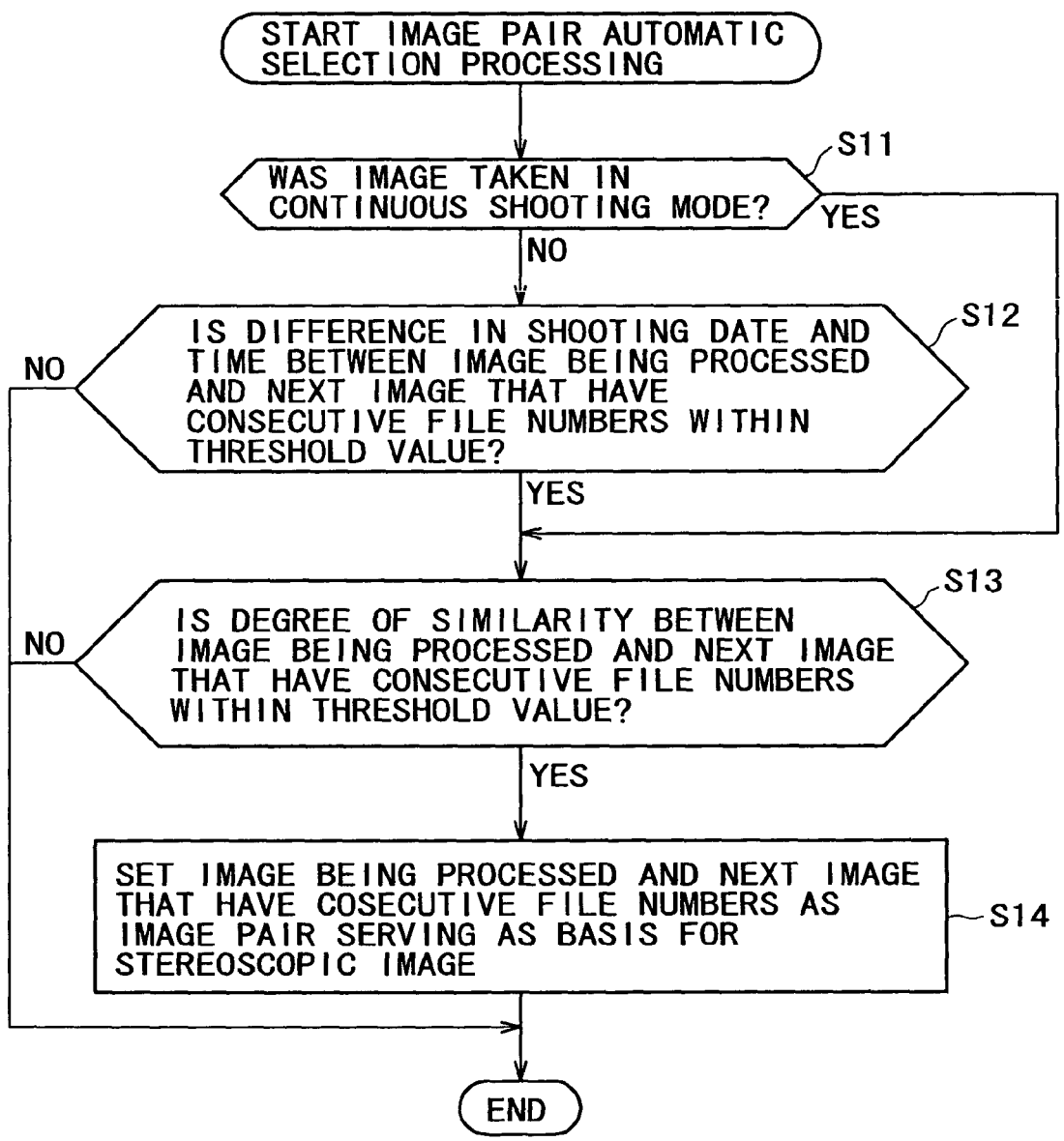
FIG. 15 is a flowchart of assistance in explaining image pair automatic selection processing.

An image pair serving as a basis for a stereoscopic image can also be selected automatically. Processing for automatically selecting an image pair will be described with reference to a flowchart of FIG. 15. This image pair automatic selection processing is started when the "image pair automatic selection" button 113 shown in FIG. 13 is pressed. The image pair automatic selection processing is performed with images inputted from the image obtaining block 73 to the base image selecting block 74 being processed one by one.

At a step S11, the base image selecting block 74 determines whether or not an image being processed was taken in a continuous shooting mode by referring to a continuous shooting flag included in the attribute information. When the base image selecting block 74 determines that the image being processed was not taken in the continuous shooting mode, the processing proceeds to a step S12.

At the step S12, the base image selecting block 74 determines whether or not a difference in shooting date and time between the image being processed and a next image taken is within a predetermined threshold value (a few seconds, for example). When the base image selecting block 74 determines that the difference in shooting date and time is within the predetermined threshold value, the processing proceeds to a step S13.

At the step S13, the base image selecting block 74 calculates a degree of similarity between the image being processed and the next image taken, and then determines whether or not the degree of similarity is within a predetermined threshold value. For example, one predetermined line of pixels is extracted from each of the images, and a sum total of differences between corresponding pixels is calculated as the degree of similarity between the two images.

When it is determined that the degree of similarity between the image being processed and the next taken image is within the predetermined threshold value, it can be determined that the image being processed and the next taken image were obtained by shooting the same object continuously. Therefore the image being processed and the next taken image are set as an image pair.

The thumbnails of the two images set as image pair are enclosed by for example a single thick frame in the main area 102 to notify the user that the two images have been set as image pair. Information on the image pair is outputted to the image managing block 72, and the information added to image data of each of the pair images is provided with additional information (serial number or the like) indicating the other of the pair images. Alternatively, the two pieces of image data for forming the image pair and the attribute information of each of the two pieces of image data may be stored in a newly created folder.

When the base image selecting block 74 determines at the step S11 that the image being processed was taken in the continuous shooting mode, the step S12 is skipped, and the processing proceeds to the step S13.

When the base image selecting block 74 determines at the step S12 that the difference in shooting date and time between the image being processed and the next taken image is not within the predetermined threshold value, the two images are not appropriate as an image pair to serve as a basis for a stereoscopic image, and hence the image pair automatic selection processing is ended.

Also when the base image selecting block 74 determines at the step S13 that the degree of similarity between the image being processed and the next taken image is not within the predetermined threshold value, the two images are not appropriate as an image pair to serve as a basis for a stereoscopic image, and hence the image pair automatic selection processing is ended. This concludes the description of the image pair automatic selection processing.

When a plurality of image pairs are set after all images inputted from the image obtaining block 73 to the base image selecting block 74 are subjected to the image pair automatic selection processing, the user can select one image pair among the plurality of set image pairs. When the user presses the "stereoscopic image" button 104 after selecting an image pair, the above-described processing from the step S6 on down is started to generate a stereoscopic image. Image data of the generated stereoscopic image is stored in association with the original image pair by the image managing block 72.

In the case where a stereoscopic image is generated on the basis of an image pair, however, if the setting of one of the pair images as an L image and the other as an R image is not appropriate (if the setting is in reverse), the stereoscopic image cannot be visually perceived three-dimensionally. In this case, when the user presses the "LR interchange" button 105, the L image and the R image are interchanged with each other, whereby a stereoscopic image that can be visually perceived three-dimensionally is regenerated.

The regeneration of a stereoscopic image by pressing the "LR interchange" button 105 is also effective when the line polarizing plate 43 is mounted displaced in the vertical direction by one line with respect to the stereoscopic image displayed.

Figure 16:
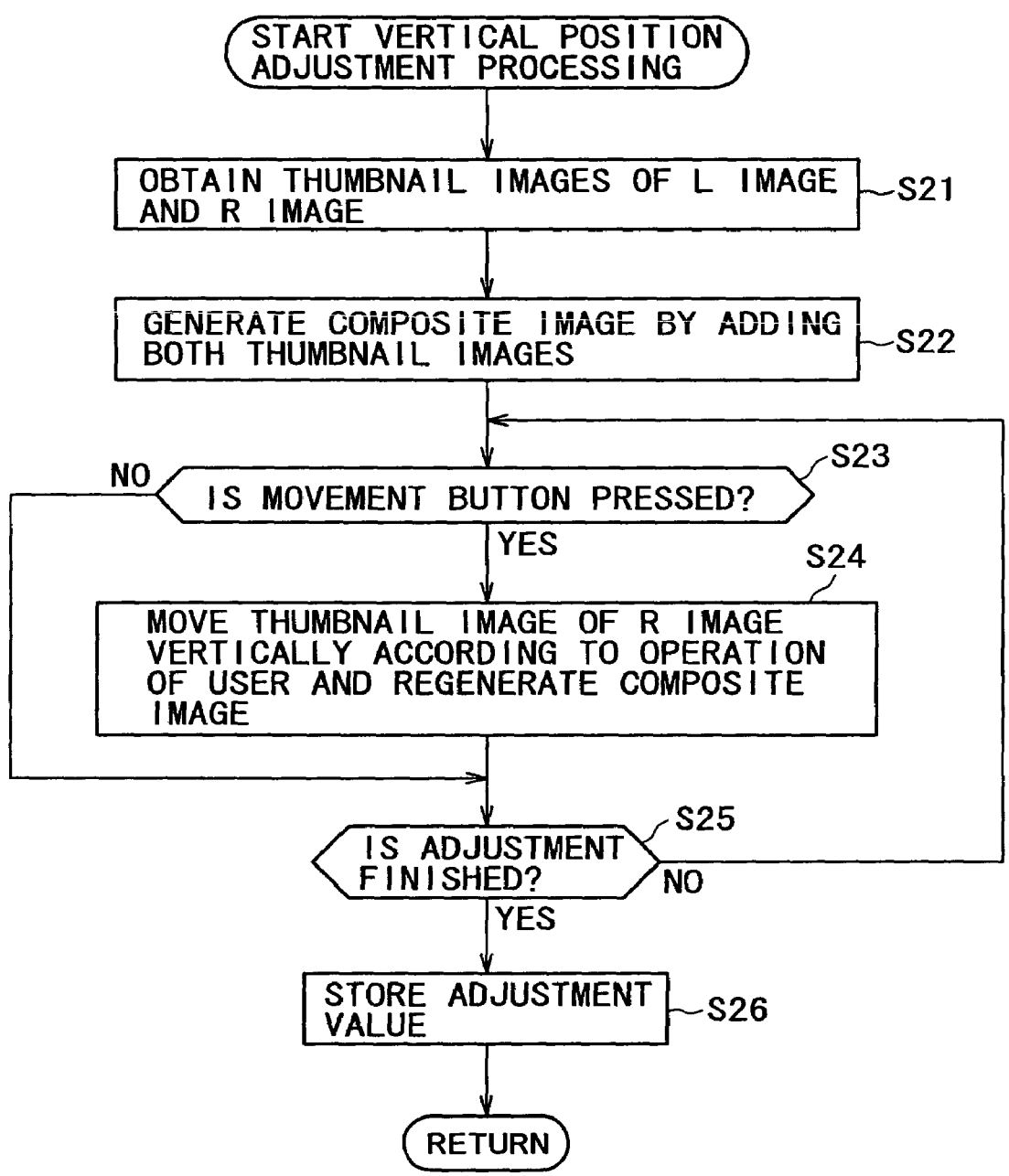
FIG. 16 is a flowchart of assistance in explaining processing for adjusting the vertical position of an L image and an R image.

Details of the processing of the step S6 in FIG. 14, that is, the processing for adjusting the vertical position of the L image and the R image will next be described with reference to a flowchart of FIG. 16 and FIG. 17.

At a step S21, the stereoscopic image generating block 75 obtains the thumbnail images of the L image and the R image set by the processing of the step S5 from the image managing block 72. At a step S22, the stereoscopic image generating block 75 adds together 50% of a pixel of the thumbnail image of the L image and 50% of a pixel of the thumbnail image of the R image which pixels are at the same coordinates to thereby generate a composite image.

Figure 17:
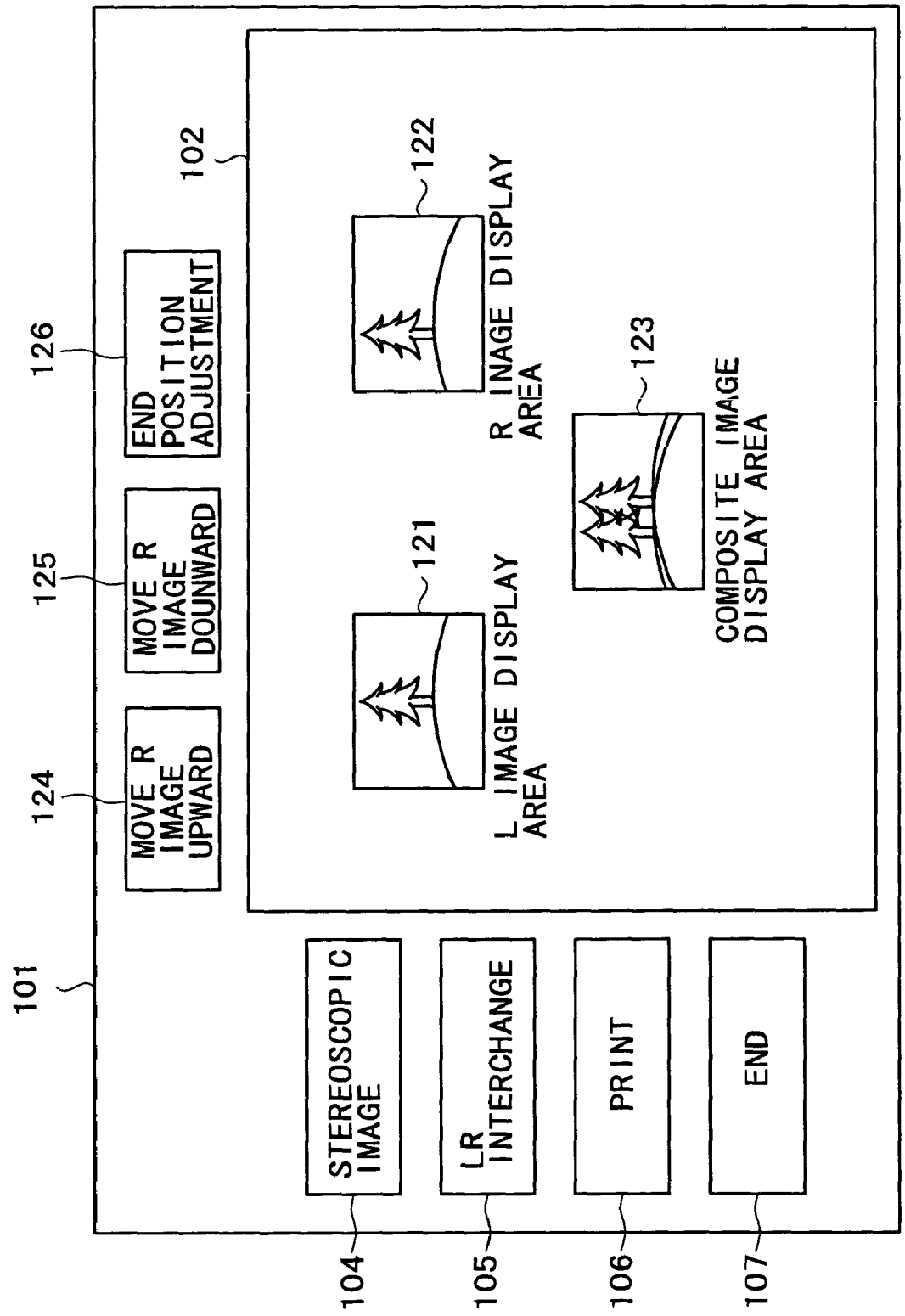
FIG. 17 is a diagram showing an example of display of the window in the processing for adjusting the vertical position of an L image and an R image.

At this time, the window 101 as shown in FIG. 17, for example, is displayed. Specifically, the main area 102 is provided with an L image display area 121 having the L image displayed therein, an R image display area 122 having the R image displayed therein, and a composite image display area 123 having the composite image displayed therein.

Provided over the main area 102 are: a "move R image upward" button 124 operated to move the relative position of the R image with respect to the L image upward and regenerate a composite image; a "move R image downward" button 125 operated to move the relative position of the R image with respect to the L image downward and regenerate a composite image; and an "end position adjustment" button 126 operated to end the adjustment of the relative position of the R image with respect to the L image.

Returning to FIG. 16, at a step S23, the GUI block 71 determines whether or not the "move R image upward" button 124 or the "move R image downward" button 125 is pressed. When the GUI block 71 determines that the "move R image upward" button 124 or the "move R image downward" button 125 is pressed, the processing proceeds to a step S24. At the step S24, under control from the GUI block 71 in accordance with an operation of the user, the stereoscopic image generating block 75 moves the relative position of the R image with respect to the L image upward or downward, and regenerates a composite image.

At this time, the display in the composite image display area 123 is updated to the regenerated composite image. When the GUI block 71 determines at the step S23 that the "move R image upward" button 124 and the "move R image downward" button 125 are not pressed, the step S24 is skipped, and the processing proceeds to a step S25.

At the step S25, the GUI block 71 determines whether or not the "end position adjustment" button 126 is pressed. When the GUI block 71 determines that the "end position adjustment" button 126 is not pressed, the processing returns to the step S23 to repeat the processing from the step S23 on down.

Thus, the user can adjust the vertical position of the L image and the R image by pressing the "move R image upward" button 124 or the "move R image downward" button 125 while viewing the composite image displayed in the composite image display area 123. Incidentally, since the composite image that is regenerated and displayed is a reduced image with a small amount of data, the regeneration processing is performed quickly.

When the GUI block 71 determines at the step S25 that the "end position adjustment" button 126 is pressed, the processing proceeds to a step S26. At the step S26, the stereoscopic image generating block 75 outputs an adjustment value for the vertical position of the L image and the R image to the image managing block 72. The image managing block 72 adds the vertical position adjustment value to the attribute information of the parallax image. When an image pair is set as the L image and the R image, the vertical position adjustment value is added to the attribute information of both the pair images. Thereafter the processing returns to the foregoing step S7 in FIG. 14.

This concludes the description of the processing for adjusting the vertical position of the L image and the R image.

Incidentally, while in the above description, the relative position of the R image with respect to the L image is moved upward or downward by pressing the "move R image upward" button 124 or the "move R image downward" button 125, the relative position of the R image with respect to the L image may be moved upward or downward by for example dragging and dropping the composite image displayed in the composite image display area 123 upward or downward using the mouse (operating input unit 56).

Figure 18:
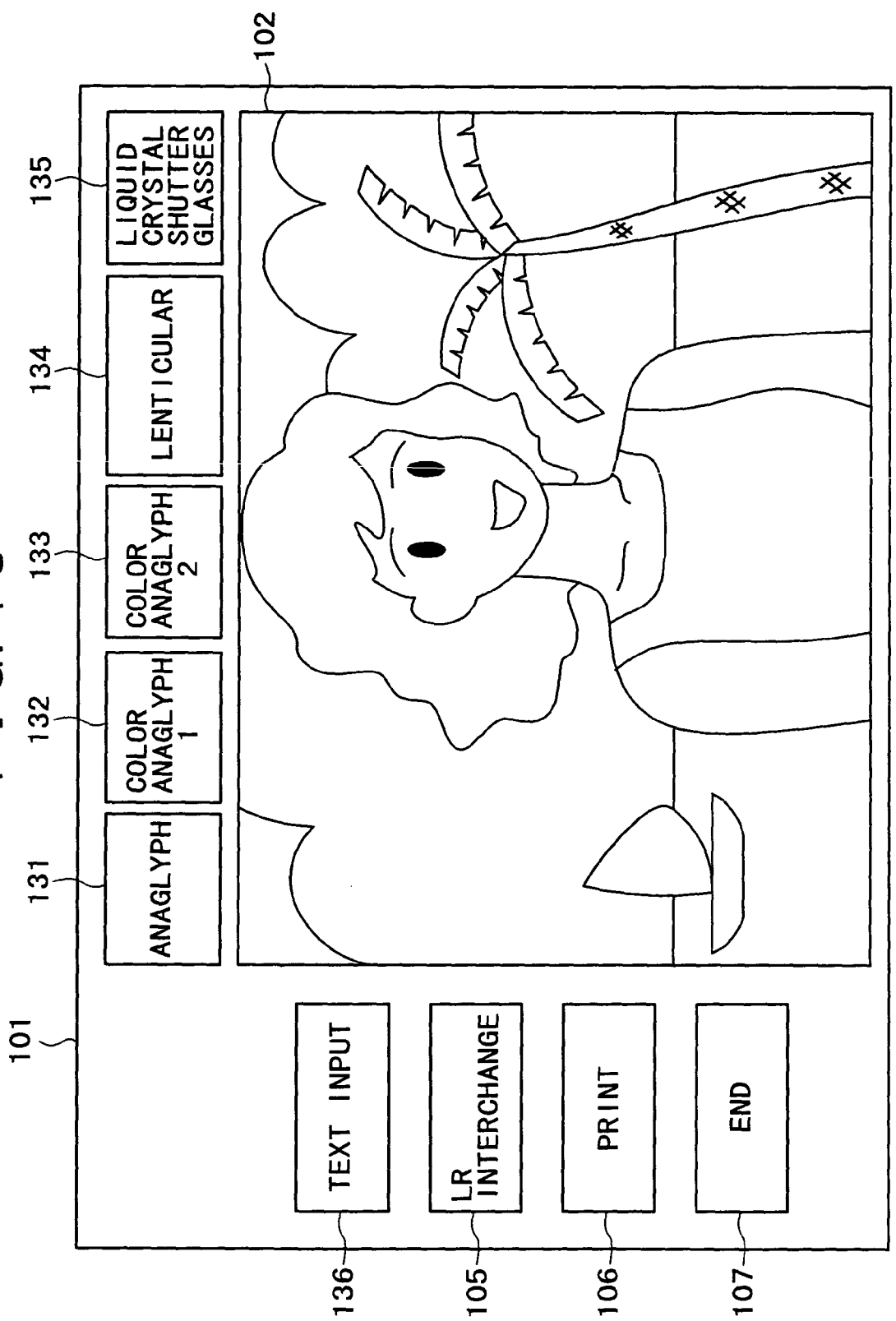
FIG. 18 is a diagram showing an example of display of the window when a stereoscopic image is generated.

Next, FIG. 18 shows an example of display of the window 101 when a stereoscopic image is generated. The generated stereoscopic image is displayed in the main area 102.

Provided on an upper side of the main area 102 are an "anaglyph" button 131 to a "liquid crystal shutter glasses" button 135 pressed to convert the display of the main area 102 from the stereoscopic image to an image that can be visually perceived three-dimensionally by a conventional stereoscopic method using an L image and an R image that served as a basis for the stereoscopic image. Also, a "text input" button 136 pressed to write arbitrary characters, symbols and the like in the generated stereoscopic image is added on a left side of the main area 102.

An "anaglyph" button 131 is pressed to generate an image of an anaglyph system (hereinafter described as an anaglyph image) using the L image and the R image that served as a basis for the stereoscopic image. A "color anaglyph 1" button 132 is pressed to generate an image of a first color anaglyph system (hereinafter described as a first color anaglyph image) using the L image and the R image that served as a basis for the stereoscopic image. A "color anaglyph 2" button 133 is pressed to generate an image of a second color anaglyph system (hereinafter described as a second color anaglyph image) using the L image and the R image that served as a basis for the stereoscopic image. In these cases, the user needs to view the images with red and blue glasses.

A "lenticular" button 134 is pressed to generate an image of a lenticular system (hereinafter described as a first lenticular image) using the L image and the R image that served as a basis for the stereoscopic image. In this case, the user needs to view the image through a lenticular screen.

A "liquid crystal shutter glasses" button 135 is pressed to display the L image and the R image that served as a basis for the stereoscopic image by a time division stereoscopic television system. In this case, the user needs to view the image with liquid crystal shutter glasses that have a left eye side and a right eye side opened and closed alternately in synchronism with field cycles of the display unit 57.

Figure 19:
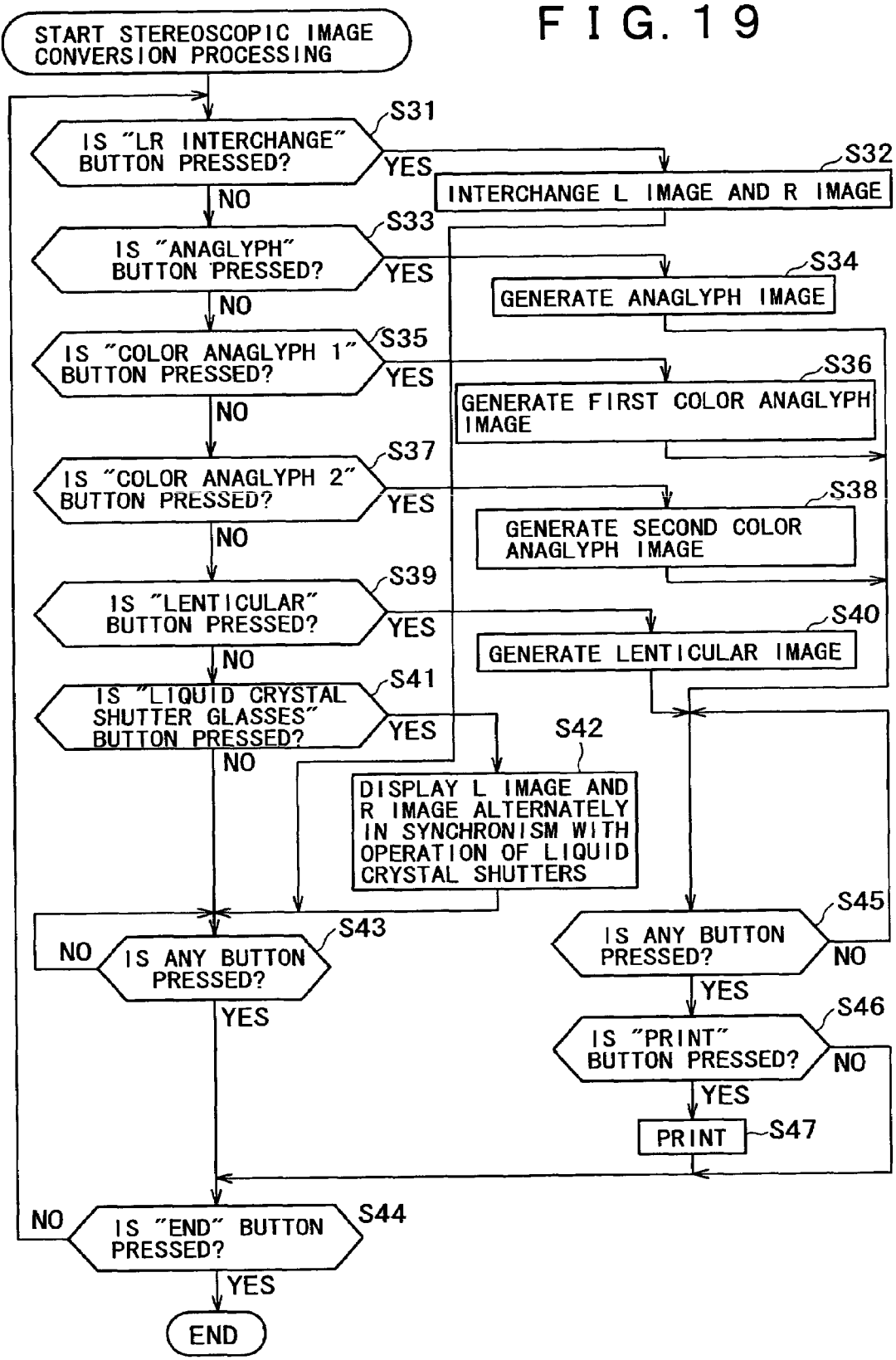
FIG. 19 is a flowchart of assistance in explaining stereoscopic image conversion processing.

Processing for converting a stereoscopic image displayed in the main area 102 in response to operation of the user will next be described with reference to a flowchart of FIG. 19.

This stereoscopic image conversion processing is started when a stereoscopic image is generated and a window 101 as shown in FIG. 18 is displayed.

At a step S31, the GUI block 71 determines whether or not the "LR interchange" button 105 is pressed. When the GUI block 71 determines that the "LR interchange" button 105 is pressed, the processing proceeds to a step S32. At the step S32, under control from the GUI block 71, the stereoscopic image generating block 75 interchanges the L image and the R image that served as a basis for the stereoscopic image currently generated, and thereby regenerates a stereoscopic image. The display control block 76 displays the regenerated stereoscopic image in the main area 102. Thereafter the processing proceeds to a step S43.

When the GUI block 71 determines at the step S31 that the "LR interchange" button 105 is not pressed, the processing proceeds to a step S33. At the step S33, the GUI block 71 determines whether or not the "anaglyph" button 131 is pressed. When the GUI block 71 determines that the "anaglyph" button 131 is pressed, the processing proceeds to a step S34. At the step S34, under control from the GUI block 71, the stereoscopic image generating block 75 generates an anaglyph image using the L image and the R image that served as a basis for the stereoscopic image currently generated. The display control block 76 displays the generated anaglyph image in the main area 102. Thereafter the processing proceeds to a step S45.

When the GUI block 71 determines at the step S33 that the "anaglyph" button 131 is not pressed, the processing proceeds to a step S35. At the step S35, the GUI block 71 determines whether or not the "color anaglyph 1" button 132 is pressed. When the GUI block 71 determines that the "color anaglyph 1" button 132 is pressed, the processing proceeds to a step S36. At the step S36, under control from the GUI block 71, the stereoscopic image generating block 75 generates a first color anaglyph image using the L image and the R image that served as a basis for the stereoscopic image currently generated. The display control block 76 displays the generated first color anaglyph image in the main area 102. Thereafter the processing proceeds to the step S45.

When the GUI block 71 determines at the step S35 that the "color anaglyph 1" button 132 is not pressed, the processing proceeds to a step S37. At the step S37, the GUI block 71 determines whether or not the "color anaglyph 2" button 133 is pressed. When the GUI block 71 determines that the "color anaglyph 2" button 133 is pressed, the processing proceeds to a step S38. At the step S38, under control from the GUI block 71, the stereoscopic image generating block 75 generates a second color anaglyph image using the L image and the R image that served as a basis for the stereoscopic image currently generated. The display control block 76 displays the generated second color anaglyph image in the main area 102. Thereafter the processing proceeds to the step S45.

When the GUI block 71 determines at the step S37 that the "color anaglyph 2" button 133 is not pressed, the processing proceeds to a step S39. At the step S39, the GUI block 71 determines whether or not the "lenticular" button 134 is pressed. When the GUI block 71 determines that the "lenticular" button 134 is pressed, the processing proceeds to a step S40. At the step S40, under control from the GUI block 71, the stereoscopic image generating block 75 generates a lenticular image using the L image and the R image that served as a basis for the stereoscopic image currently generated. The display control block 76 displays the generated lenticular image in the main area 102. Thereafter the processing proceeds to the step S45.

When the GUI block 71 determines at the step S39 that the "lenticular" button 134 is not pressed, the processing proceeds to a step S41. At the step S41, the GUI block 71 determines whether or not the "liquid crystal shutter glasses" button 135 is pressed. When the GUI block 71 determines that the "liquid crystal shutter glasses" button 135 is pressed, the processing proceeds to a step S42. At the step S42, under control from the GUI block 71, the stereoscopic image generating block 75 supplies the L image and the R image that served as a basis for the stereoscopic image currently generated to the display control block 76. The display control block 76 alternately displays the L image and the R image in the main area 102 in synchronism with field cycles of the display unit 57 under control from the GUI block 71. Thereafter the processing proceeds to the step S43.

At the step S43, the GUI block 71 stands by until some button is pressed. When it is determined that some button is pressed, the processing proceeds to a step S44. At the step S44, the GUI block 71 determines whether or not the "end" button 107 is pressed. When the GUI block 71 determines that the "end" button 107 is pressed, the stereoscopic image conversion processing is ended, and the image processing program 65 being executed is also ended.

When the GUI block 71 determines at the step S44 that the "end" button 107 is not pressed, the processing returns to the step S31 to repeat the processing from the step S31 on down.

At the step S45 carried out after the processing of the step S34, S36, S38, or S40, the GUI block 71 stands by until some button is pressed. When it is determined that some button is pressed, the processing proceeds to a step S46. At the step S46, the GUI block 71 determines whether or not the "print" button 106 is pressed. When the GUI block 71 determines that the "print" button 106 is pressed, the processing proceeds to a step S47. At the step S47, under control from the GUI block 71, the display control block 76 outputs image data of the anaglyph image, the first color anaglyph image, the second color anaglyph image, or the lenticular image displayed in the main area 102 to a printer (not shown) for printing.

The printed anaglyph image, first color anaglyph image, or second color anaglyph image can be visually perceived three-dimensionally by using red and blue glasses. The printed lenticular image can be visually perceived three-dimensionally through a lenticular panel. This concludes the description of the stereoscopic image conversion processing.

Figure 20:
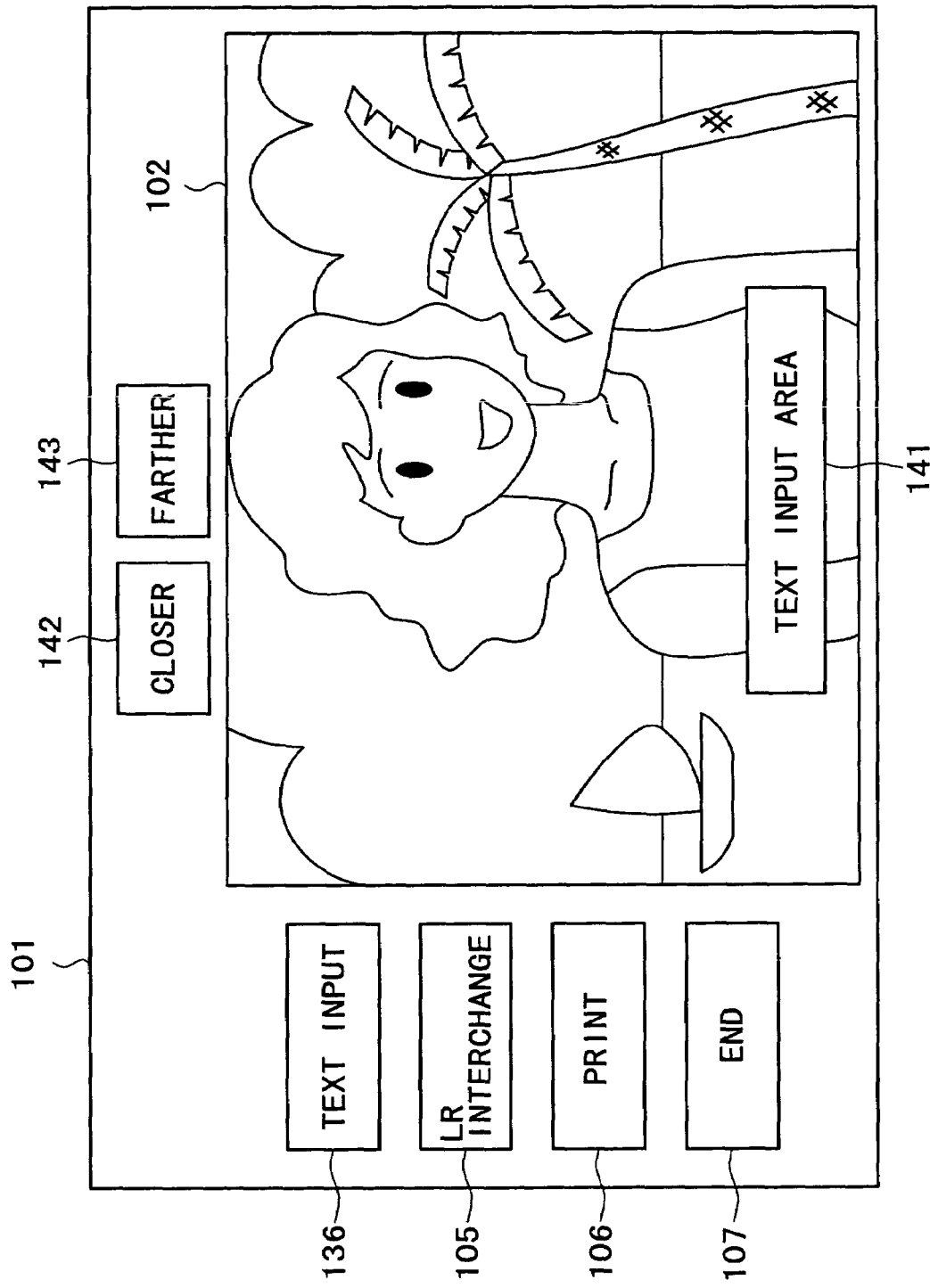
FIG. 20 is a diagram showing an example of display of the window when a "text input" button in FIG. 18 is pressed.

Next, FIG. 20 shows an example of display of the window 101 when the "text input" button 136 is pressed. Provided on a lower side of the main area 102 is a text input area 141 for displaying arbitrary characters, symbols and the like in a state of being superimposed on the stereoscopic image displayed in the main area 102. The characters and the like inputted in the text input area 141 are superimposed on the stereoscopic image so as to be visually perceived three-dimensionally. The user can move the text input area 141 to an arbitrary position by dragging and dropping the text input area 141 using the mouse (operating input unit 56).

Provided on an upper side of the main area 102 are: a "closer" button 142 pressed to set the characters and the like inputted in the text input area 141 closer in stereoscopic perspective; and a "farther" button 143 pressed to set the characters and the like inputted in the text input area 141 farther in stereoscopic perspective.

Text input processing will be described in the following with reference to a flowchart of FIG. 21. This text input processing is started when the "text input" button 136 is pressed.

At a step S51, the display control block 76 displays the text input area 141 so as to be superimposed on the stereoscopic image displayed in the main area 102. When the user inputs arbitrary characters and the like in the text input area 141, the stereoscopic image generating block 75 superimposes the characters and the like on the stereoscopic image such that the inputted characters and the like are visually perceived three-dimensionally in predetermined perspective.

At a step S52, the GUI block 71 determines whether or not the "closer" button 142 is pressed. When the GUI block 71 determines that the "closer" button 142 is pressed, the processing proceeds to a step S53. At the step S53, under control from the GUI block 71, the stereoscopic image generating block 75 superimposes the characters and the like on the stereoscopic image such that the inputted characters and the like are visually perceived three-dimensionally in a closer position in perspective. When the GUI block 71 determines at the step S52 that the "closer" button 142 is not pressed, the processing of the step S53 is skipped.

At a step S54, the GUI block 71 determines whether or not the "farther" button 143 is pressed. When the GUI block 71 determines that the "farther" button 143 is pressed, the processing proceeds to a step S55. At the step S55, under control from the GUI block 71, the stereoscopic image generating block 75 superimposes the characters and the like on the stereoscopic image such that the inputted characters and the like are visually perceived three-dimensionally in a farther position in perspective. When the GUI block 71 determines at the step S54 that the "farther" button 143 is not pressed, the processing of the step S55 is skipped.

At a step S56, the GUI block 71 determines whether or not the "text input" button 136 is pressed again. When the GUI block 71 determines that the "text input" button 136 is not pressed again, the processing returns to the step S52 to repeat the processing from the step S52 on down.

When the GUI block 71 determines at the step S56 that the "text input" button 136 is pressed again, the processing proceeds to a step S57. At the step S57, the stereoscopic image generating block 75 outputs, to the image managing block 72, text information of the inputted characters and the like, information on coordinates of the characters and the like on the stereoscopic image, and information on stereoscopic perspective of the characters and the like. The image managing block 72 records the information in association with the image data of the stereoscopic image. This concludes the description of the text input processing.

It is to be noted that in the present specification, the steps describing the program recorded on a recording medium include not only processing carried out in time series in the described order but also processing carried out in parallel or individually and not necessarily in time series.

In the present specification, a system refers to an apparatus as a whole formed by a plurality of apparatus.

As described above, according to the present invention, it is possible to detect an image pair usable as an L image and an R image for stereoscopy from among a plurality of images.

While the preferred embodiments of the present invention have been described using the specific terms, such description is for illustrative purposes only, and it is to be understood that changes and variations may be made without departing from the spirit or scope of the following claims.

What is claimed is:

1. An image processing apparatus comprising:
   first detecting means for detecting image pairs each taken in a continuous shooting mode among a plurality of images;
   second detecting means for detecting image pairs each taken consecutively within a predetermined time among the plurality of images;
   presenting means for presenting, to a user, said image pairs detected by at least one of said first detecting means or said second detecting means; and
   generating means for setting one of two images comprising a selected image pair selected by the user among said image pairs presented by said presenting means as an image for the left eye and the other one of two images as an image for the right eye, and generating image data for displaying a stereoscopic image.

2. An image processing apparatus as claimed in claim 1, further comprising calculating means for calculating a degree of similarity between two images including a detected image pair detected by said first detecting means or said second detecting means.

3. An image processing apparatus as claimed in claim 1, wherein said presenting means presents, to user, said image pairs having a degree of similarity equal to or more than a threshold value.

4. An image processing apparatus as claimed in claim 1, further comprising receiving means for receiving a user operation for selecting two images to be set as said selected image pair from among the plurality of images.

5. An image processing apparatus as claimed in claim 1, further comprising recording means for recording image data of the two images comprising said selected image pair in association with the image data for displaying said stereoscopic image.

6. An image processing method to be implemented by an image processing apparatus, the method comprising:
- a first detecting step for detecting image pairs each taken in a continuous shooting mode among a plurality of images;
- a second detecting step for detecting image pairs each taken consecutively within a predetermined time among the plurality of images;
- a presenting step for presenting, to a user, said image pairs detected by processing of at least one of said first detecting step or said second detecting step; and
- a generating step for setting one of two images comprising a selected image pair selected by the user among said image pairs presented by processing of said presenting step as an image for the left eye and the other are of two images as an image for the right eye, and generating image data for displaying a stereoscopic image.

7. A computer readable medium on which is recorded a computer executable program which, when executed, performs a method comprising:
- a first detecting step for detecting image pairs each taken in a continuous shooting mode among a plurality of images;
- a second detecting step for detecting image pairs each taken consecutively within a predetermined time among the plurality of images;
- a presenting step for presenting, to a user, said image pairs detected by processing of at least one of said first detecting step or said second detecting step; and
- a generating step for setting one of two images comprising a selected image pair selected by the user among said image pairs presented by processing of said presenting step as an image for the left eye and the other one of the two images as an image for the right eye, and generating image data for displaying a stereoscopic image.

8. A computer readable medium on which is recorded a computer executable program which, when executed, performs a method for generating image data comprising:
- a first detecting step for detecting image pairs each taken in a continuous shooting mode among a plurality of images;
- a second detecting step for detecting image pairs each taken consecutively within a predetermined time among the plurality of images;
- a presenting step for presenting, to a user, said image pairs detected by processing of at least one of said first detecting step or said second detecting step; and
- a generating step for setting one of two images comprising a selected image pair selected by the user among said image pairs presented by processing of said presenting step as an image for the left eye and the other one of the images as an image for the right eye, and generating image data for displaying a stereoscopic image.

* * * * *